US012086522B2

(12) United States Patent
Chen et al.

(10) Patent No.: US 12,086,522 B2
(45) Date of Patent: Sep. 10, 2024

(54) METHOD OF GENERATING NETLIST INCLUDING PROXIMITY-EFFECT-INDUCER (PEI) PARAMETERS

(71) Applicant: TAIWAN SEMICONDUCTOR MANUFACTURING COMPANY, LTD., Hsinchu (TW)

(72) Inventors: Yen-Pin Chen, Hsinchu (TW); Florentin Dartu, Hsinchu (TW); Wei-Chih Hsieh, Hsinchu (TW); Tzu-Hen Lin, Hsinchu (TW); Chung-Hsing Wang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 141 days.

(21) Appl. No.: 17/353,991

(22) Filed: Jun. 22, 2021

(65) Prior Publication Data
US 2022/0245318 A1    Aug. 4, 2022

Related U.S. Application Data

(60) Provisional application No. 63/143,539, filed on Jan. 29, 2021.

(51) Int. Cl.
*G06F 30/392* (2020.01)
*G06F 30/327* (2020.01)
(Continued)

(52) U.S. Cl.
CPC .......... *G06F 30/392* (2020.01); *G06F 30/327* (2020.01); *G06F 30/398* (2020.01); *G06F 2119/18* (2020.01)

(58) Field of Classification Search
CPC .... G06F 30/392; G06F 30/398; G06F 30/327; G06F 13/16; G06F 13/4068;
(Continued)

(56) References Cited

U.S. PATENT DOCUMENTS 7,260,442 B2    8/2007   Hwang et al.
8,224,637 B1    7/2012   Sowards et al.
(Continued)

FOREIGN PATENT DOCUMENTS

TW    201705454    2/2017
TW    201803075    1/2018
(Continued)

OTHER PUBLICATIONS

Office Action dated Jul. 27, 2022 for corresponding case No. DE 10 2021 116 850.3 (p. 1).

*Primary Examiner* — Binh C Tat
(74) *Attorney, Agent, or Firm* — Hauptman Ham, LLP

(57) ABSTRACT

For a method of manufacturing a semiconductor device, a corresponding layout diagram is stored on a non-transitory computer-readable medium, the layout diagram being arranged relative to first and second perpendicular directions, the layout diagram including cells such that, for a subset of the cells, each subject one of the cells (subject cell) in the subset has a neighborhood including first and second neighbor cells on corresponding first and second sides of the subject cell relative to the first direction. The method includes: for each subject cell in the subset, generating a sidefile which represents neighborhood-specific proximity-effect information. For each cell in the subset of the cells, the generating a sidefile includes populating the sidefile with a first neighbor-specific proximity-effect (NSPE) parameter corresponding to an inter-cell proximity-effect induced by the first neighbor cell and a second NSPE parameter corre-
(Continued)

sponding to an inter-cell proximity-effect induced by the second neighbor cell.

20 Claims, 17 Drawing Sheets

(51) Int. Cl.
*G06F 30/398* (2020.01)
*G06F 119/18* (2020.01)

(58) Field of Classification Search
CPC .... G06F 13/4265; G06F 30/394; G06F 30/30; G06F 30/367; G06F 30/39; G06F 2111/20; G06F 2119/12; G06F 30/3312; G06F 2119/06; G06F 30/20; G06F 2111/04; G06F 2111/12; G06F 2119/18; G06F 30/31; G06F 30/38; G06F 30/3323; G06F 21/14; G06F 2115/08; G06F 30/34; G06F 30/33; G06F 2113/18; G06F 2111/08; G06F 2119/02; G06F 30/333; G06F 30/35; G06F 30/36; G06F 21/72; G06F 21/755; G06F 2117/12; G06F 2119/10; G06F 30/347; G06F 30/3953; G06F 2119/04; G06F 2119/08; G06F 30/00; G06F 30/27; G06F 30/323; G06F 30/331; G06F 30/3947; G06F 3/061; G06F 3/0655; G06F 3/0679; G06F 30/3308; G06F 30/373; G03F 1/36; H01L 27/0207; H01L 27/11807; H01L 23/528; H01L 2027/11875; H01L 2027/11874; H01L 29/66439; H01L 29/775; H01L 29/78642; H01L 21/768; H01L 21/76886; H01L 29/0657; H01L 2924/00; H01L 27/0688; H01L 21/823885; H01L 28/00
USPC ................................................ 716/100–108
See application file for complete search history.

(56) References Cited

U.S. PATENT DOCUMENTS

| | | |
|---|---|---|
| 9,256,709 B2 | 2/2016 | Yu et al. |
| 10,831,970 B2* | 11/2020 | Sautter .................. G11C 11/418 |
| 2006/0010407 A1 | 1/2006 | Terai et al. |
| 2014/0040838 A1 | 2/2014 | Liu et al. |
| 2015/0278429 A1 | 10/2015 | Chang |
| 2018/0122793 A1* | 5/2018 | Moroz .............. H01L 29/78642 |
| 2019/0211475 A1* | 7/2019 | Ito ........................ C12N 5/0606 |

FOREIGN PATENT DOCUMENTS

| | | |
|---|---|---|
| TW | I732472 | 7/2021 |
| TW | 202131094 | 8/2021 |

* cited by examiner

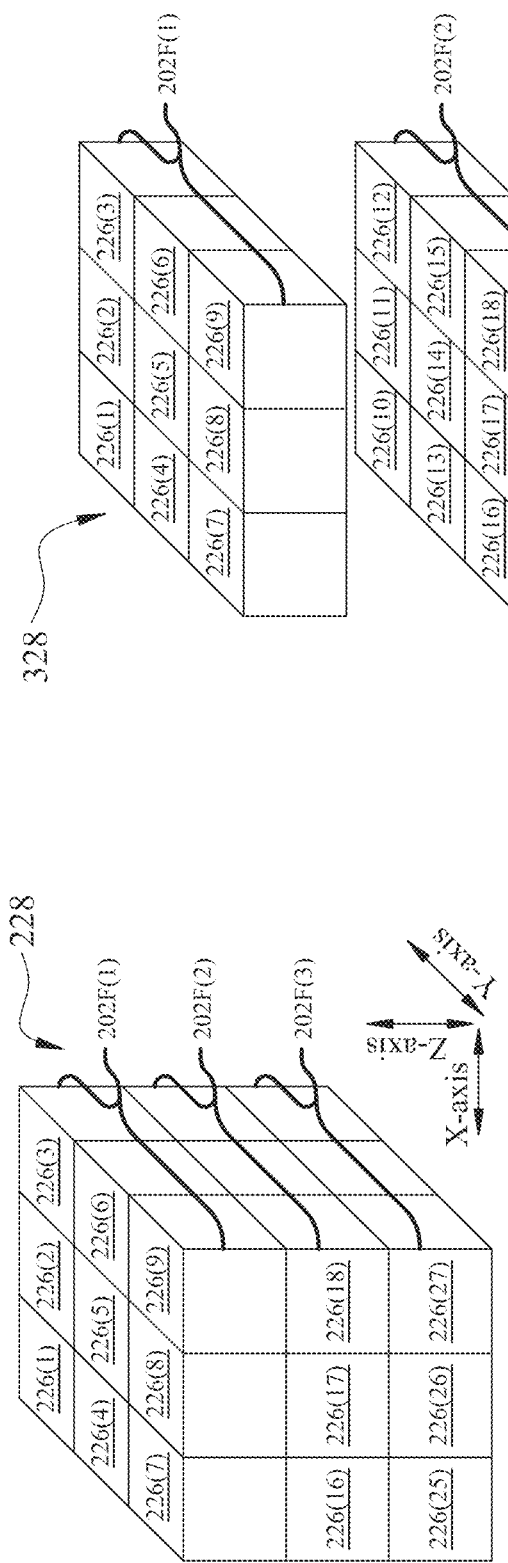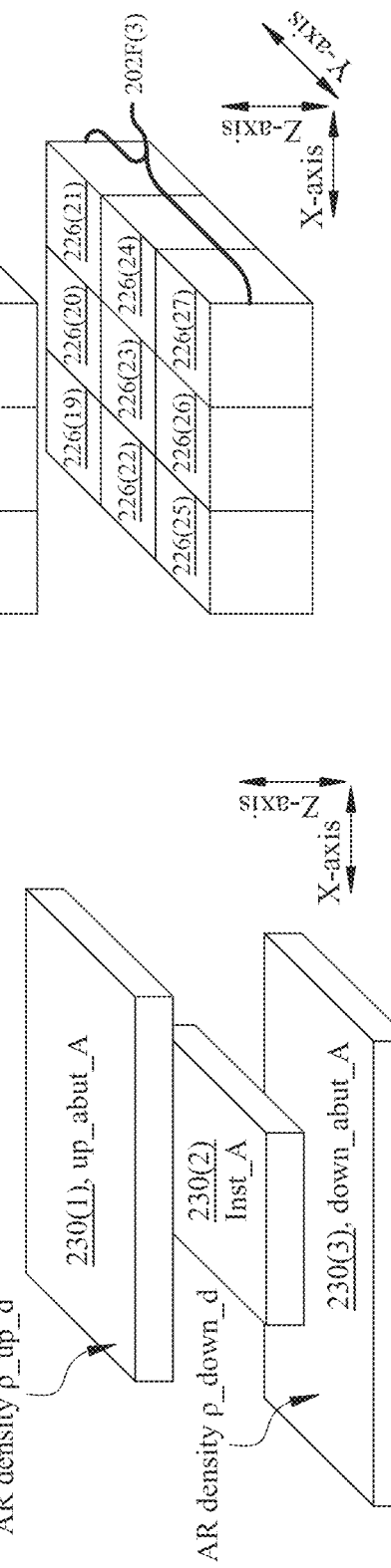

Fig. 3A — 332A

| | Column 1 | Column 2 | Column 3 | Column 4 |
|---|---|---|---|---|
| Row 1 | INVD1BWP | | | |
| Row 2 | | | | |
| Row 3 | | Subject | Neighbor | Left-Nearest N/P FET | Right-Nearest N/P FET |
| Row 4 | | | | | |
| Row 5 | | 218(2)_Ins_A | 218(1)_LL_abut_A | N2:P7 | N8:P3 |
| Row 6 | | 218(2)_Ins_A | 218(3)_RR_abut_A | N7:P7 | N7:P7 |
| Row 7 | | 218(5)_Ins_B | 218(4)_LL_abut_B | N3:P5 | N5:P7 |
| Row 8 | | 218(5)_Ins_B | 218(6)_RR_abut_B | N8:P8 | N2:P2 |
| Row 9 | | 218(8)_Ins_C | 218(7)_LL_abut_C | N4:P4 | N4:P4 |
| Row 10 | | 218(8)_Ins_C | 218(9)_RR_abut_C | N3:P6 | N7:P4 |

Fig. 3B — 332B

| | Column 1 | Column 2 | Column 3 |
|---|---|---|---|
| Row 1 | #Cellname | W | L |
| Row 2 | | | |
| Row 3 | 222(2)_Inst_A | 2 | 2 |
| Row 4 | 222(1)_TT_abut_A | 2 | 5 |
| Row 5 | 222(3)_BB_abut_A | 1 | 3 |

Fig. 3C — 332C

| | Column 1 | Column 2 |
|---|---|---|
| Row 1 | #Cellname | density |
| Row 2 | | |
| Row 3 | 230(2)_Inst_A | |
| Row 4 | 230(1)_up_abut_A | 0.50 |
| Row 5 | 230(3)_down_abut_A | 0.20 |

334A

```
Row 1: <GAP netlist plus proximity-effect-inducer (PEI) parameters>
Row 2: .subckt INVD1BWP IN1 OUT3 L0=3 L1=3 R0=3 R1=3
Row 3: XMM1 ZN I VDD pch_lvt_mac L=8e-9 nfin=4 enviro_scatr_a#="f(R1)" enviro_scatr_b#="f(L1)"
Row 4: XMM2 ZN I VSS nch_lvt_mac L=8e-9 nfin=4 enviro_scatr_a#="f(R0)" enviro_scatr_b#="f(L0)"
Row 5: .ends
```

```
Row 1: <GAP netlist plus proximity-effect-inducer (PEI) parameters>
Row 2: .subckt INVD1BWP I ZN GW0=0 GL0=0 GW1=0 GL1=0
Row 3: XMM1 ZN I VDD pch_lvt_mac L=8e-9 enviro_rktng0="f(GW0,GL0)"
Row 4: XMM2 ZN I VSS nch_lvt_mac L=8e-9 enviro_rktng1="f(GW1,GW1)"
Row 5: .ends
```

```
Row 1: <GAP netlist plus proximity-effect-inducer (PEI) parameters>
Row 2: .subckt INVD1BWP I ZN ρ_up_d=0.1 ρ_down_d=0.1
Row 3: XMM1 ZN I VDD pch_lvt_mac L=8e-9 enviro_ρ="f(ρ_up_d)"
Row 4: XMM2 ZN I VSS nch_lvt_mac L=8e-9 enviro=ρ"f(ρ_down_d)"
Row 5: .ends
```

Fig. 4C

| | |
|---|---|
| Row 1 | <GAP netlist plus proximity-effect-inducer (PEI) parameters> |
| Row 2 | X_218(2)_Ins_A IN1 OUT1 INVD1BWP GL0=8 GL1=3 GR0=7 GR1=7 |
| Row 3 | X_218(5)_Ins_B OUT1 OUT2 INVD1BWP GL0=8 GL1=8 GR0=5 GR1=7 |
| Row 4 | X_218(8)_Ins_C OUT2 OUT3 INVD1BWP GL0=7 GL1=4 GR0=4 GR1=4 |

| | |
|---|---|
| Row 1 | <GAP netlist plus proximity-effect-inducer (PEI) parameters> |
| Row 2 | X_222(2)_Inst_A in1 out1 INVD1BWP W0=2 L0=5 W1=1 L1=3 |

| | |
|---|---|
| Row 1 | <GAP netlist plus proximity-effect-inducer (PEI) parameters> |
| Row 2 | X_230(2)_Ins_A in1 out1 INVD1BWP up_d=0.5 down_d=0.5 |

METHOD OF GENERATING NETLIST INCLUDING PROXIMITY-EFFECT-INDUCER (PEI) PARAMETERS

PRIORITY CLAIM

The present application claims the priority of U.S. Provisional Application No. 63/143,539, filed Jan. 29, 2021, which is incorporated by reference herein in its entirety.

BACKGROUND

An integrated circuit (IC) includes one or more semiconductor devices. One way in which to represent a semiconductor device is with a plan view diagram referred to as a layout diagram. Based upon a layout diagram, a corresponding netlist is generated. Based upon the netlist, a simulation is performed of the semiconductor device corresponding to the layout diagram.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A, 2B, 2C, 2D, 2E, 2F, 2G and 2H are corresponding layout diagrams, in accordance with some embodiments.

FIGS. 3A, 3B and 3C are corresponding sidefiles, in accordance with some embodiments.

FIGS. 4A, 4B and 4C are corresponding globally-variable, parameterized netlists, in accordance with some embodiments.

FIGS. 5A, 5B and 5C are corresponding local parameterized netlists, in accordance with some embodiments.

DETAILED DESCRIPTION

Figure 1A:
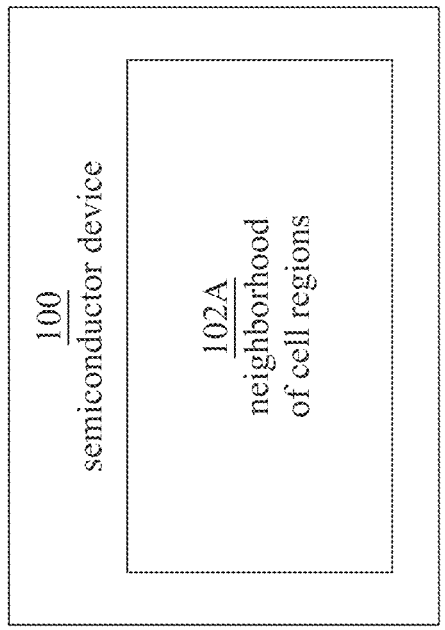
FIG. 1A is a block diagram of a semiconductor device, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

At least some embodiments arise in the context of a neighborhood of cells in a layout diagram. At the center of the neighborhood is a subject cell. The cells of the neighborhood which surround the subject cell are neighbor cells. During manufacture of a semiconductor device corresponding to the layout diagram, a cell region corresponding to the subject cell suffers proximity effects, which are examples of a layout-dependent effects. For example, there are two types of proximity effects. A first type of proximity effect occurs where a first given structure in a given cell is a proximity-effect inducing structure (inducer) that induces a proximity-effect in a second given structure in the same given cell. The first type of proximity effect is referred to as an intra-cell proximity effect. A second type of proximity effect occurs where a first given structure in a given first cell is a proximity-effect inducer that induces a proximity-effect in a second given structure in a second given cell. The second type of proximity effect is referred to as an inter-cell proximity effect.

When translating a design into a layout diagram and the corresponding netlist, another approach represents proximity effects upon a subject cell by generating a sidefile which represents the inter-cell proximity effects of the neighbor cells using a single neighborhood parameter. Furthermore, the other approach assigns one of two predefined values to the neighborhood parameter, namely either a worst-case-scenario value or a best-case-scenario value. The other approach provides a 'gross' level of granularity. By contrast, some embodiments generate a sidefile that expands the sidefile of the other approach to include at least a first neighbor-specific proximity-effect (NSPE) parameter corresponding to an inter-cell proximity-effect induced by a first neighbor cell, and a second NSPE parameter corresponding to an inter-cell proximity-effect induced by a second neighbor cell. Accordingly, such embodiments provide a more granular, and thus more accurate, representation of the proximity-effects upon the subject cell which are induced by two or more neighbor cells, which facilitates faster and better simulations.

In some embodiments, for a subset of transistor-to-well-edge-influenced (TWEI) cells in a layout diagram, each TWEI cell including one or more transistors in one or more corresponding wells, a netlist is generated which represents the subset. Such a netlist, for each TWEI cell represented in the netlist, and for a given transistor in a given well in a given cell, includes one or more proximity-effect-inducer (PEI) parameters each PEI parameter being related to an intra-cell physical proximity of the given transistor to an edge of the given well (given well-edge). Accordingly, such embodiments provide a more accurate representation of well-effects, which facilitates faster and better simulations.

FIG. 1A is a block diagram of a semiconductor device 100 in accordance with at least one embodiment of the present disclosure.

In FIG. 1A, semiconductor device 100 includes, among other things, a neighborhood 102 of cell regions. Examples of layout diagrams resulting in neighborhood 102 of cell regions include the layout diagrams in each of FIGS. 2A, 2B, 2C, 2D, 2E, 2F, 2G and 2H, or the like.

Figure 1B:
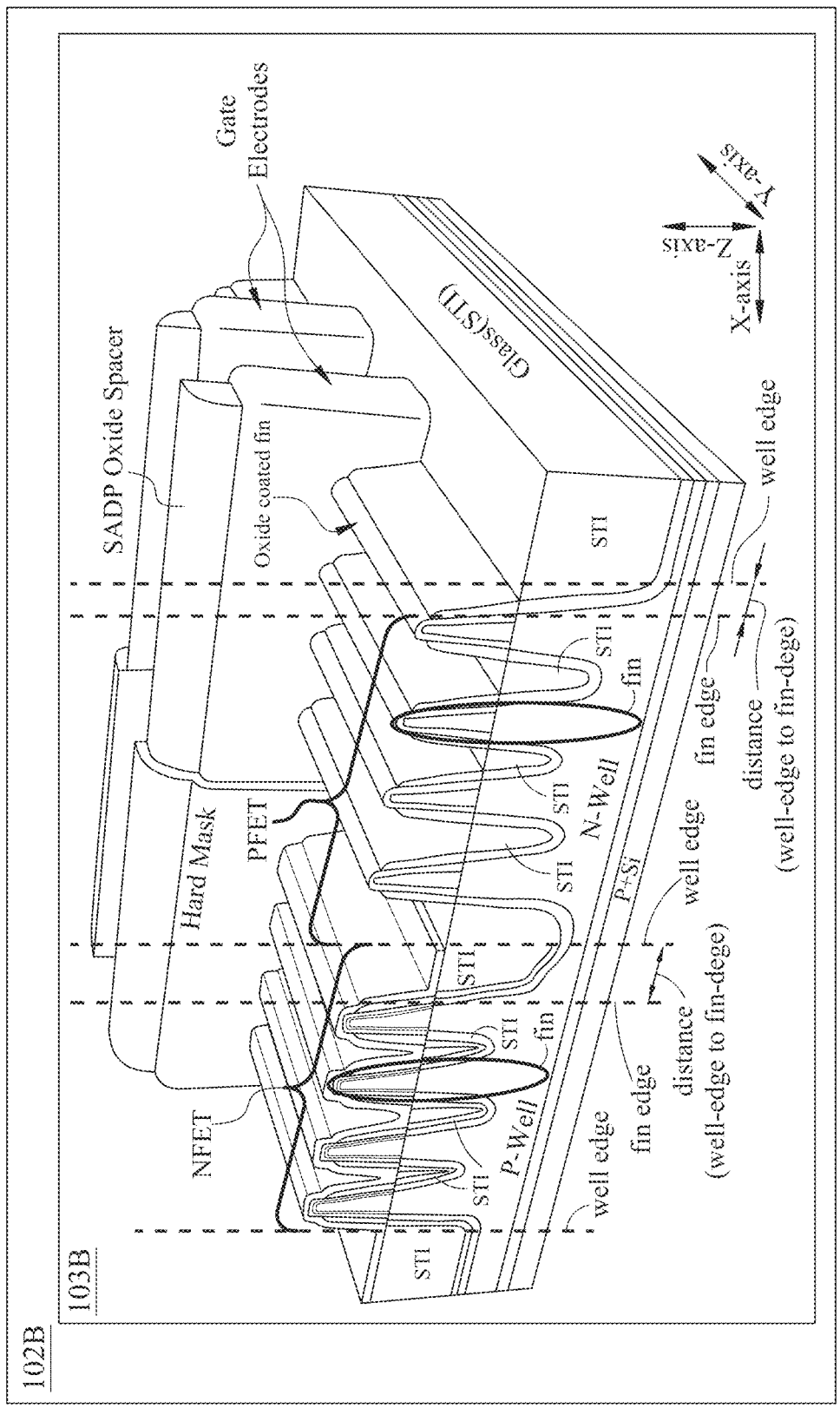
FIG. 1B is three-quarter perspective view of a cell region in a neighborhood region of a semiconductor device, in accordance with some embodiments.

FIG. 1B is three-quarter perspective view of a cell region 103B in a neighborhood region 102B of a semiconductor device, e.g., semiconductor device 100, in accordance with some embodiments.

For purposes of discussion, FIG. 1B is simplistic. Neighborhood region 102B, and thus cell region 103B, is assumed to have a finFET architecture, which is configured according to complementary metal oxide semiconductor (CMOS) technology. Accordingly, cell region 103B includes an N-type (or N-channel) field-effect (NFET) transistor and a P-type (or P-channel) field-effect (PFET) transistor. The NFET includes four fins which are formed in P-well. The PFET includes four fins which are formed in an N-well. In some embodiments, other NFETs correspondingly include other numbers of fins. In some embodiments, other PFETs correspondingly include other numbers of fins.

In the discussion of FIG. 4A below, mention is made of distance from a transistor to a corresponding edge of a given well (given well-edge). Examples of such distances are shown in FIG. 1B.

Figure 2A:
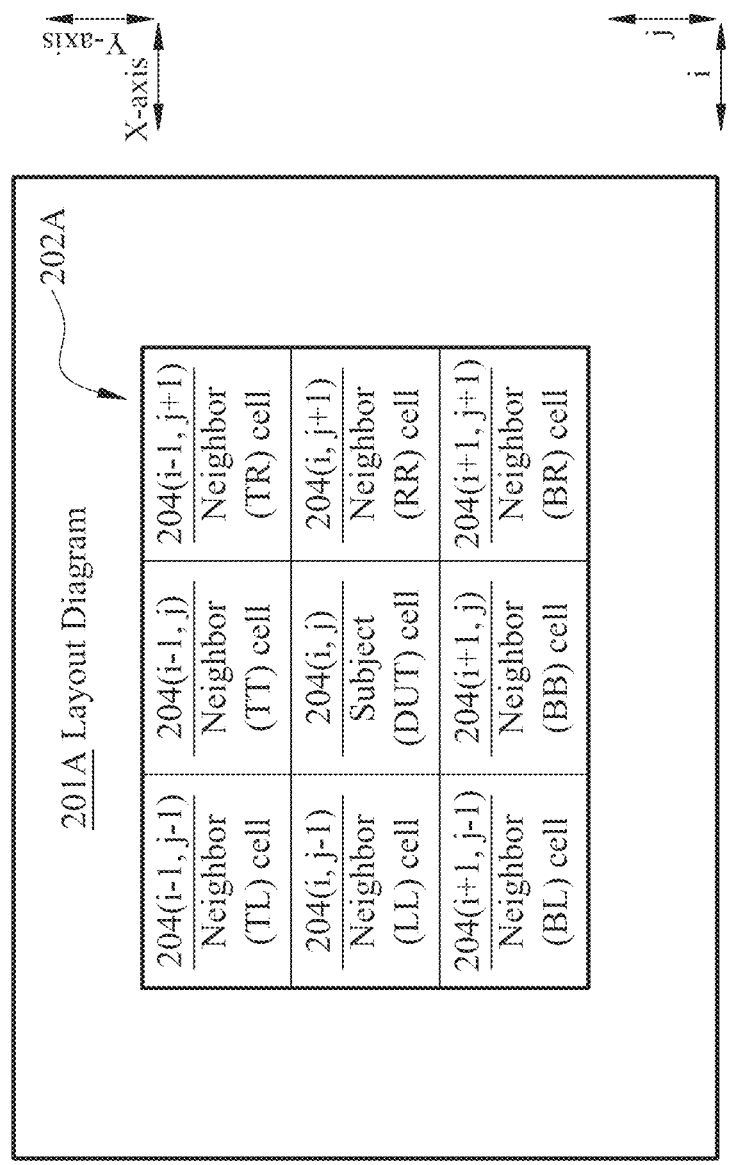
Figure 2B:
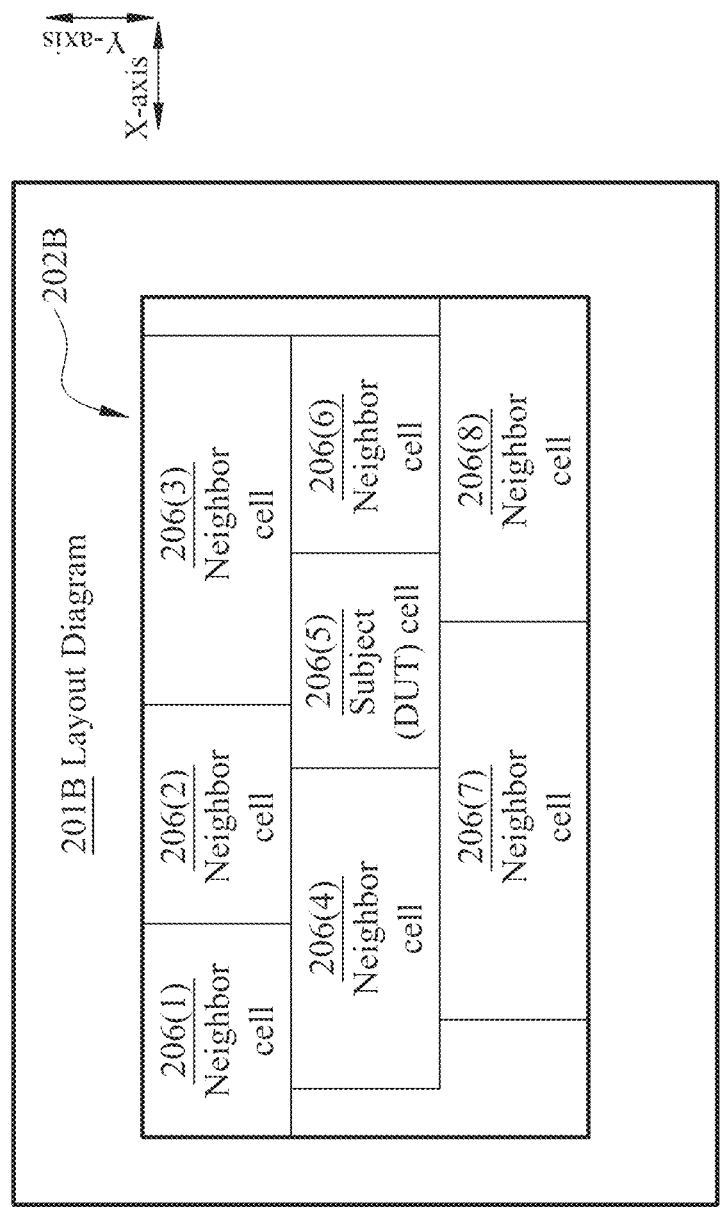
Figure 2C:
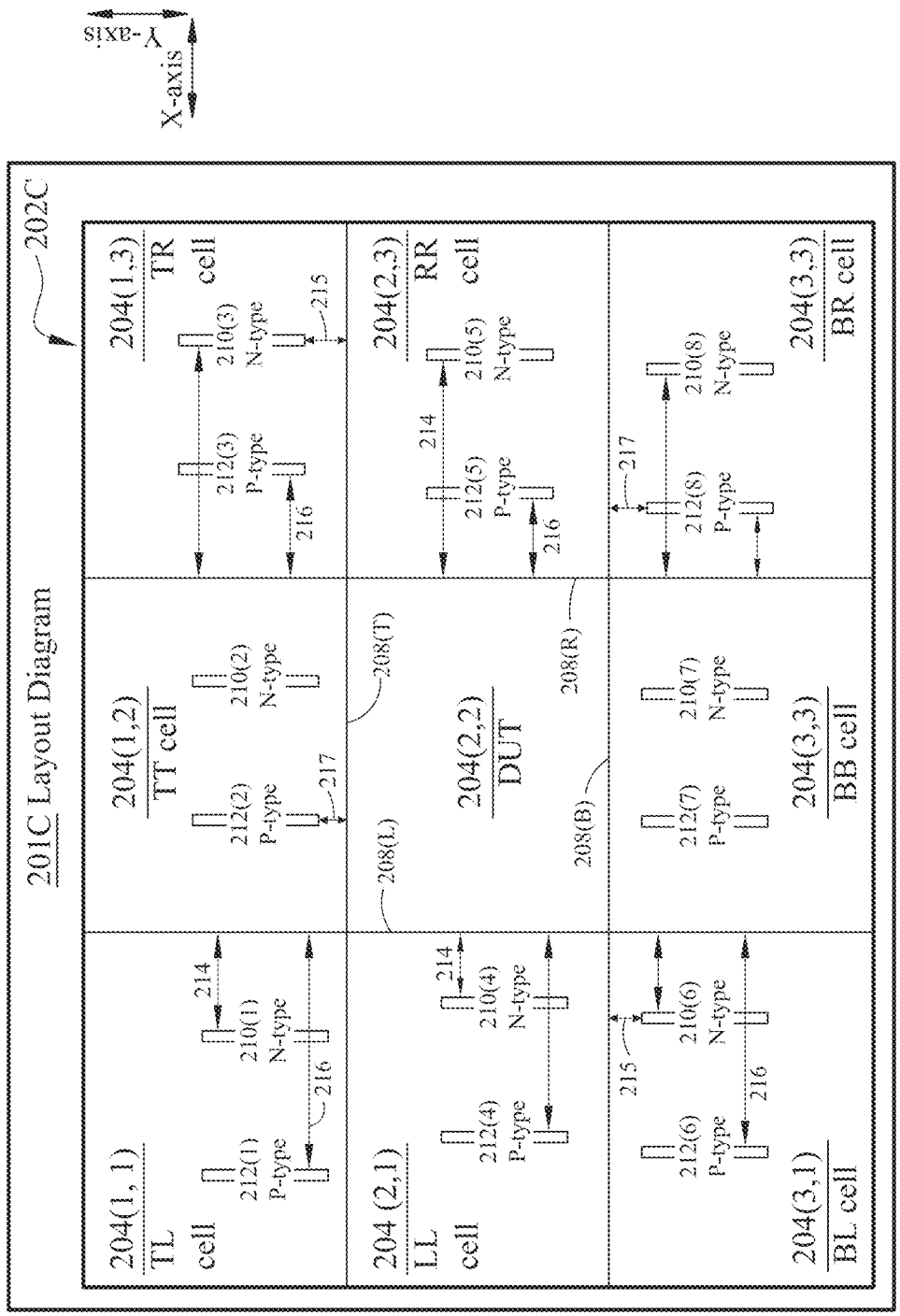

FIG. 2A-2C are corresponding layout diagrams 201A, 201B and 201C, in accordance with some embodiments.

The layout diagrams of FIGS. 2A-2C are representative of corresponding portions of corresponding semiconductor devices. Structures in the semiconductor device are represented by patterns (also known as shapes) in the layout diagram. For simplicity of discussion, elements in the layout diagrams of FIGS. 2A-2C (and of other figures included herein) will be referred to as if they are structures rather than patterns per se. For example, element 204(i,j) in FIG. 2A is a cell pattern (shape) that represents a cell region in the corresponding semiconductor device. In the following discussion, element 204(i,j) is referred to as a cell region, or more simply a cell, rather than as a cell pattern.

Layout diagram 201A describes basic two-dimensional spatial relationships in neighborhood 202A. As described below, such spatial relationships contribute to layout-dependent effects experienced by, among others, the cell in the center of neighborhood 202A.

In FIG. 2A, neighborhood 202A includes a first group of nine cells arranged in a 3×3 grid of rows and columns. More particularly, neighborhood 202A includes cells 204(i-1,j-1), 204(i-1,j), 204(i-1,j+1), 204(ij-1), 204(i,j), 204(ij+1), 204(i+1,j-1), 204(i+1,j), and 204(i+1,j+1), where each of i and j is a corresponding positive integer, i is a variable that represents a row number, $1 \leq i \leq 3$, j is a variable that represents a column number, and $1 \leq j \leq 3$. Cell 204(i,j) is at the center of neighborhood 202A, and is referred to herein as the subject cell of neighborhood 202A. In some embodiments, cell 204(i,j) is referred to as the device under test (DUT) cell. Cells in neighborhood 202A other than subject cell 204(i,j) are referred to as neighbor cells.

In neighborhood 202A, neighbor cell 204(i-1,j), which abuts the top side of subject cell 204(i,j), is also referred to as a top-top (TT) cell. Neighbor cell 204(i+1j), which abuts the bottom side of subject cell 204(i,j), is also referred to as a bottom-bottom (BB) cell. Neighbor cell 204(i,j-1), which abuts the left side of subject cell 204(i,j), is also referred to as a left-left (LL) cell. Neighbor cell 204(i,j+1), which abuts the right side of subject cell 204(i,j), is also referred to as a right-right (RR) cell.

Also in neighborhood 202A, neighbor cell 204(i-1,j-1), which abuts the top-left diagonal-corner of subject cell 204(i,j), is also referred to as a top-left (TL) cell. Neighbor cell 204(i-1,j+1), which abuts the top-right diagonal-corner of subject cell 204(i,j), is also referred to as a top-right (TR) cell. Neighbor cell 204(i+1j-1), which abuts the bottom-left diagonal-corner of subject cell 204(i,j), is also referred to as a bottom-left (BL) cell. Neighbor cell 204(i+1j+1), which abuts the bottom-right diagonal-corner of subject cell 204 (i,j), is also referred to as a bottom-right (BR) cell.

For simplicity of illustration, FIG. 2A assumes one neighborhood in layout diagram 201A. In some embodiments, more typically, layout diagram 201A includes a great many cells, with neighborhood 202A representing one set of nine cells. In some embodiments, a second group of nine cells is determined by shifting the perimeter of neighborhood 202A so that neighborhood 202A is centered on a different cell. For example, a second group is determined by shifting the perimeter of neighborhood 202A one column to the right. As such, cell 204(i,j+1) is the subject cell of the second group. The second group includes 204(i-1,j), 204(i-1,j+1), 204(i, j), 204(i,j+1), 204(i+1j) and 204(i+1j+1), as well as cells 204(i-1,j+2) (not shown), 204(i,j+2) (not shown) and 204 (i+1j+2) (not shown). For example, a third group is determined by shifting the perimeter of neighborhood 202A one row down. As such, cell 204(1+1,j) is the subject cell of the third group. The third group includes 204(i,j-1), 204(i,j), 204(i,j+1), 204(i+1,j-1), 204(1+1,j), and 204(i+1,j+1) as well as cells 204(i+2,j-1) (not shown), 204(i+2,j) (not shown) and 204(i+2,j+1) (not shown).

FIG. 2B is a version of FIG. 2A. More particularly, in layout diagram 201B of FIG. 2B, it is assumed that cells in neighborhood 202B are of non-uniform sizes at least with respect to the X-axis. By contrast, in layout diagram 201A of FIG. 2A, for simplicity, it is assumed that cells in neighborhood 202A are of uniform size.

Neighborhood 202B includes: neighbor cells 206(1), 206 (2), 206(3), 206(4), 206(6), 206(7) and 206(8); and subject cell 206(5). In light of the non-uniform sizes of cells, in some embodiments, subject cell 206(5) is substantially at the center of neighborhood 202B. In light of the non-uniform sizes of cells, in some embodiments, subject cell 206(5) is approximately at the center of neighborhood 202B.

FIG. 2C is a version of FIG. 2A, wherein FIG. 2C includes proximity-effect inducing structures (inducers) in corresponding neighbor cells. In some embodiments, proximity-effect inducers in corresponding neighbor cells are represented by neighbor-specific proximity-effect (NSPE) parameters (discussed below) in a sidefile (discussed below) associated with the subject cell.

For simplicity of discussion, FIG. 2C assumes that neighborhood 202 corresponds to rows 1-3 and columns 1-3 of layout diagram 201C. Accordingly, cell 204(2,2) is the subject cell of neighborhood 202C. Subject cell 204(2,2) has a top side 208(T), a bottom side 208(B), a left side 208(L) and a right side 208(R).

More particularly, FIG. 2C is an example of a layout diagram that includes proximity-effect inducing structures (inducers) in corresponding neighbor cells 204(1,1), 204(1, 2), 204(1,3), 204(2,1), 204(2,3), 204(3,1), 204(3,2) and 204(3,3).

In FIG. 2C, it is assumed that each of the cells in neighborhood 202C is configured according to complementary metal oxide semiconductor (CMOS) technology such that each of the cells includes one or more N-type (or N-channel) field-effect (NFET) transistors and one or more P-type (or P-channel) field-effect (PFET) transistors. For each neighbor cell, a nearest NFET in the given neighbor cell is the NFET which is physically nearest to subject cell 204(2,2). The nearest NFET is a proximity-effect inducing structure; that is, the nearest NFET in the given neighbor cell induces a proximity-effect in subject cell 204(2,2). Also, for each neighbor cell, a nearest PFET in the given neighbor cell is the PFET which is physically nearest to subject cell 204(2,2). The nearest PFET is a proximity-effect inducing structure; that is, the nearest PFET in the given neighbor cell induces a proximity-effect in subject cell 204(2,2).

In FIG. 2C, each of the NFETs and PFETs is assumed to have a finFET architecture. Accordingly, the nearest NFETs are represented simplistically as N-type fins 210(1), 210(2), 210(3), 210(4), 210(5), 210(6), 210(7), 210(8) and 210(9). Relative to the X-axis, horizontal distances correspondingly from the N-type fins to subject cell 204(2) are labelled as 214. Relative to the Y-axis, vertical distances from the N-type fins to subject cell 204(2) are labelled as 215. The nearest PFETs are represented simplistically as P-type fins 212(1), 212(2), 212(3), 212(4), 212(5), 212(6), 212(7), 212(8) and 212(9). Relative to the X-axis, nearest horizontal distances from the P-type fins to subject cell 204(2) are labelled as 216. Relative to the Y-axis, nearest vertical distances from the P-type fins to subject cell 204(2) are labelled as 217.

For example, nearest NFET 210(1) in TL cell 204(1,1) has a nearest horizontal distance 214 from left side 208(L) of subject cell 204(2,2), and a nearest vertical distance 215 from top side 208(T) of subject cell 204(2,2). Nearest PFET 212(1) in TL cell 204(1,1) has a nearest horizontal distance 216 from left side 208(L) of subject cell 204(2,2), and a nearest vertical distance 217 from top side 208(T) of subject cell 204(2,2). Nearest NFET 210(8) in TL cell 204(3,3) has a nearest horizontal distance 214 from right side 208(R) of subject cell 204(2,2), and a nearest vertical distance 215 from bottom side 208(B) of subject cell 204(2,2). Nearest PFET 212(8) in TL cell 204(3,3) has a nearest horizontal distance 216 from right side 208(R) of subject cell 204(2,2), and a nearest vertical distance 217 from bottom side 208(B) of subject cell 204(2,2).

Regarding FIG. 2C, in some embodiments (not shown), each of the NFETs and PFETs is assumed to have an architecture other than finFET architecture, e.g., gate-all-around FET architecture, complementary field effect transistor (CFET) architecture, nano wire transistor architecture, nano sheet transistor architecture, planar transistor architecture, or the like.

Figure 2D:
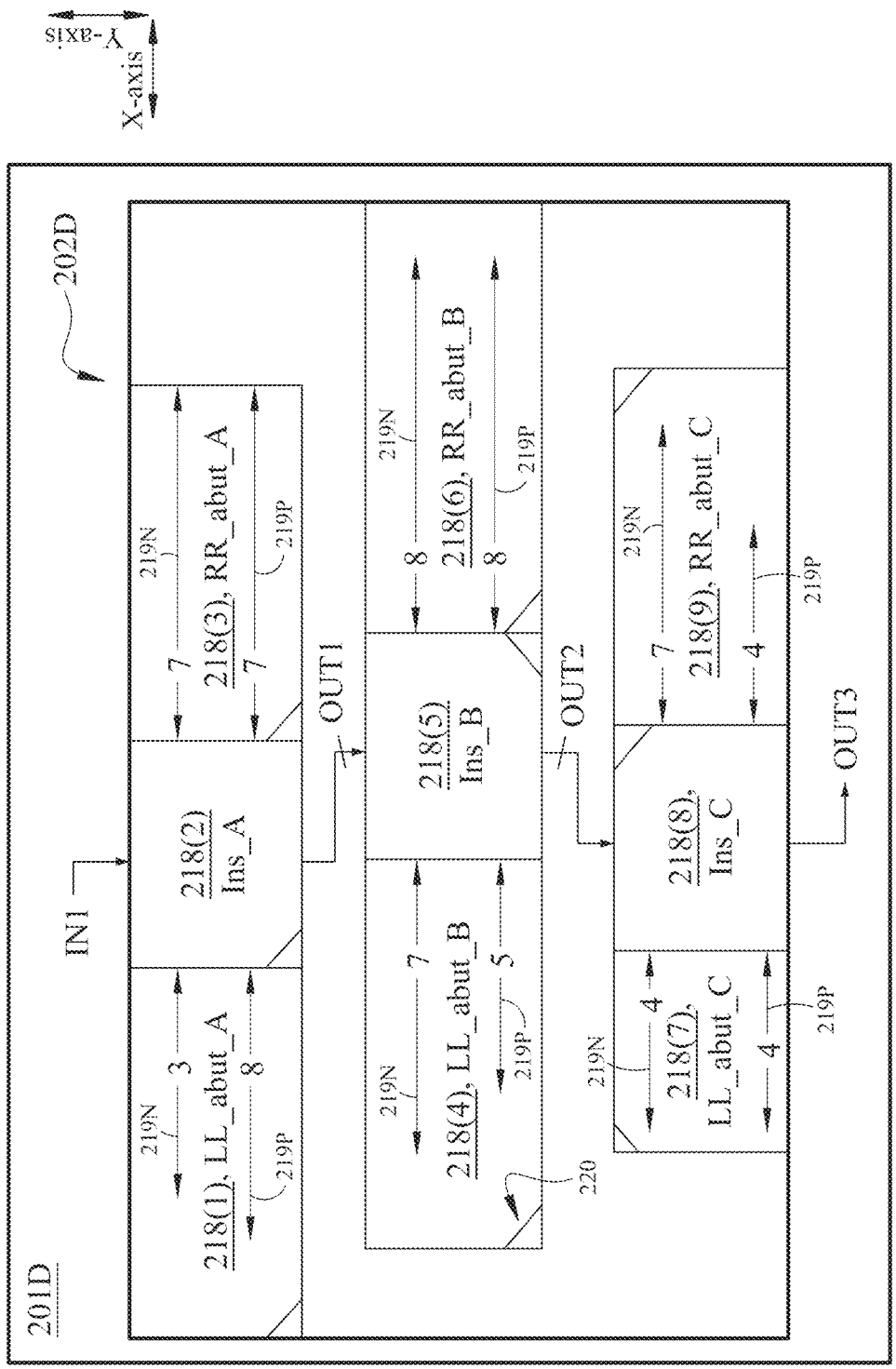

FIG. 2D is a layout diagram 201D, in accordance with some embodiments.

Layout diagram 201D has similarities to layout diagram 201B of FIG. 2B (and thus to FIG. 2A), and also to layout diagram 201C of FIG. 2C. Accordingly, layout diagram 201D describes basic two-dimensional spatial relationships in neighborhood 202D. As described below, such spatial relationships contribute to layout-dependent effects experienced by, among others, the cell in the center of neighborhood 202D. More particularly, layout diagram 201D is similar to layout diagram 201B in that layout diagram 201D assumes that cells in neighborhood 202D are of non-uniform sizes at least with respect to the X-axis.

Layout diagram 201D is similar to layout diagram 201C in that layout diagram 201D is assumed to have a finFET architecture, and includes nearest NFETs (not shown) and nearest PFETs (not shown) in corresponding neighbor cells. Nearest horizontal distances to NFETs and PFETs are correspondingly indicated as 219N and 219P.

Neighborhood 202D in FIG. 2D, is shown with example distance values, descriptive names and signal flow indicators for purposes of providing the basis of a corresponding example sidefile (see FIG. 3A). In general, units for, as well as values for, the corresponding instances of nearest horizontal distances 219N and 219P are determined by the design rules and scale of the corresponding semiconductor process technology node.

In particular, cell 218(5) is an inverter cell labelled Ins_B. Cell 218(2) is an inverter cell labelled Ins_A. Cell 218(8) is an inverter cell labelled Ins_C. Cell 218(5) is the subject cell of neighborhood 202D, and is also the subject cell of in the context of a 3×1 array with respect to neighbors cell 218(4) and 218(6). Cell 218(5) is labelled LL_abut_B. Cell 218(6) is labelled RR_abut_B. While cell 218(2) is a neighbor cell relative to subject cell 218(5), cell 218(2) also is a subject cell in the context of a 3×1 array with respect to neighbor cells 218(1) and 218(3). Cell 218(1) is labelled LL_abut_A. Cell 218(3) is labelled RR_abut_A. While cell 218(8) is a neighbor cell relative to subject cell 218(5), cell 218(8) also is a subject cell in the context of a 3×1 array with respect to neighbor cells 218(7) and 218(9). Cell 218(7) is labelled LL_abut_C. Cell 218(9) is labelled RR_abut_C.

Example values of nearest horizontal distances 219N and 219P are shown in FIG. 2A as follows: in cell 218(1), distance 219N is 3 and distance 219P is 8; in cell 218(3), distance 219N is 7 and distance 219P is 7; in cell 218(4), distance 219N is 7 and distance 219P is 5; in cell 218(6), distance 219N is 8 and distance 219P is 8; in cell 218(7), distance 219N is 4 and distance 219P is 4; and in cell 218(9), distance 219N is 7 and distance 219P is 4.

Also in FIG. 2D, cell orientation is indicated with a diagonal line in a corresponding corner of the cell. In combination with the sides of the cell which form the corner, the diagonal line gives the appearance of a triangle in the corner, and so is referred to as triangle 220. In some embodiments, the cell orientations are as follows.

If triangle 220 is in the lower left corner of the cell, e.g., as in cells 218(1), 218(2), 218(3), 218(4) and 218(6), then the cell has a default orientation. If triangle 220 is in the lower right corner of the cell, e.g., as in cell 218(5), then the cell is rotated 180 degrees from the default orientation with respect to the Y-axis, i.e., is mirror symmetric relative to the default orientation with respect to the Y-axis. If triangle 220 is in the upper left corner of the cell, e.g., as in cell 218(7), then the cell is rotated 180 degrees from the default orientation with respect to the X-axis, i.e., is mirror symmetric relative to the default orientation with respect to the X-axis. If triangle 220 is in the upper right corner of the cell, e.g., as in cells 218(8) and 218(9), then the cell is: rotated 180 degrees from the default orientation with respect to the Y-axis, i.e., is mirror symmetric relative to the default orientation with respect to the Y-axis; and rotated 180 degrees from the default orientation with respect to the X-axis, i.e., is mirror symmetric relative to the default orientation with respect to the X-axis.

In terms of signal flow indicators in FIG. 2D, Ins_A cell 218(2) is coupled in series with Ins_B cell 218(5), and Ins_B cell 218(5) is coupled in series with Ins_C cell 218(8). The input of Ins_A cell 218(2) is labelled IN1. Each of the output of Ins_A cell 218(2) and the input of Ins_B cell 218(5) is labelled OUT1. Each of the output of Ins_B cell 218(5) and the input of Ins_C cell 218(8) is labelled OUT2. And the output of Ins_C 218(8) is labelled OUT3. To provide room in which to insert signal flow arrows, neighborhood 202D is shown as an exploded view with respect to the Y-axis. That is, relative to the rows of cells, there is a gap between the upper row and the middle row, and between the middle row and the lower row.

Figure 2E:
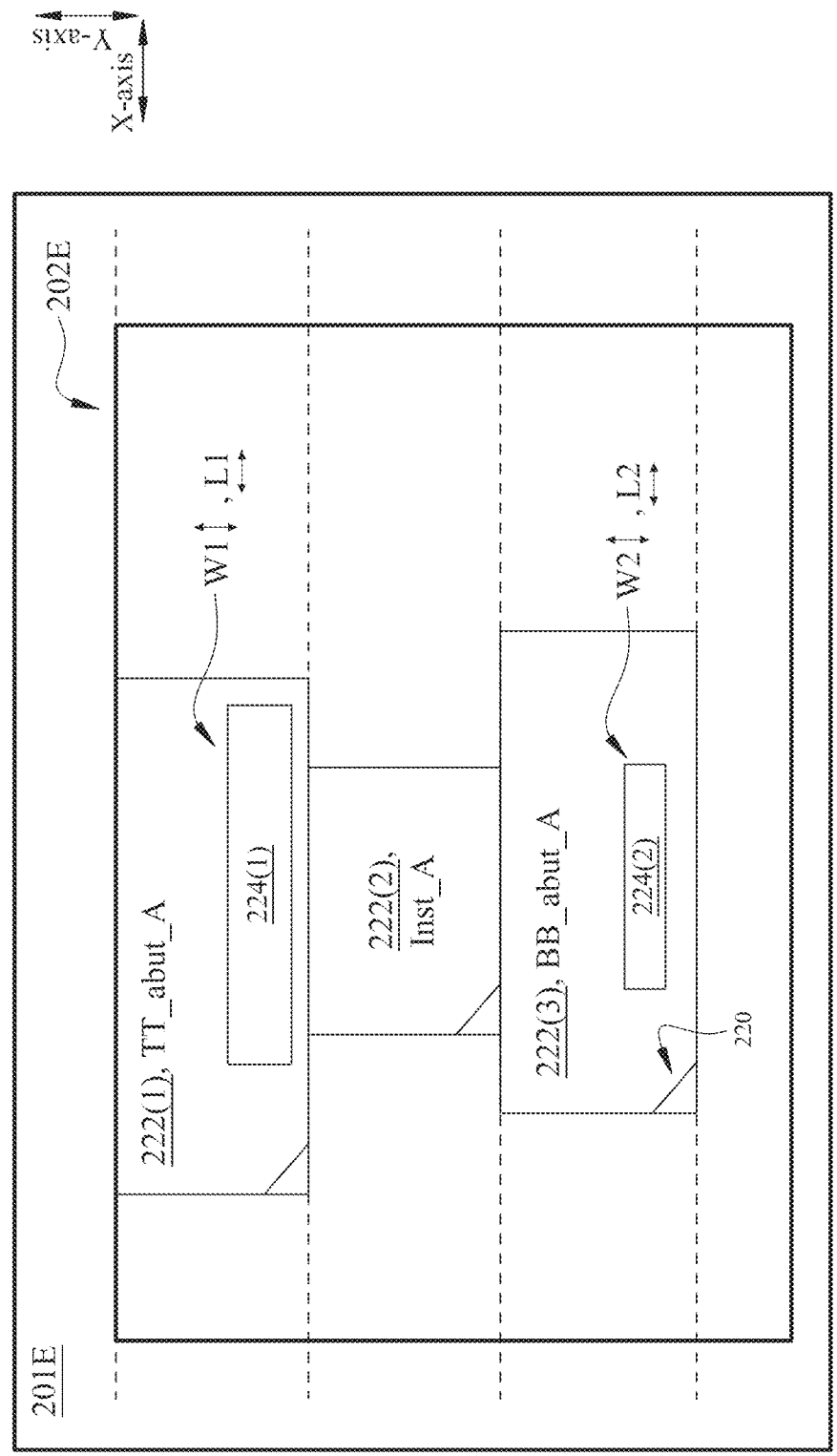

FIG. 2E is a layout diagram 201E, in accordance with some embodiments.

Layout diagram 201E has similarities to layout diagram 201D of FIG. 2D. Accordingly, layout diagram 201E describes basic two-dimensional spatial relationships in neighborhood 202E. As described below, such spatial relationships contribute to layout-dependent effects experienced by, among others, the cell in the center of neighborhood 202E.

Layout diagram 201E also is similar to layout diagram 201C in that layout diagram 201E includes proximity-effect inducing structures (inducers) in corresponding neighbor cells. In some embodiments, proximity-effect inducers in corresponding neighbor cells are represented by neighbor-specific proximity-effect (NSPE) parameters (discussed below) in a sidefile (discussed below) associated with the subject cell, and/or in a globally-variable parameterized (GAP) netlist (discussed below) associated with the subject cell, and/or in a parameterized netlist (discussed below) associated with the subject cell.

In FIG. 2E, the proximity-effect inducers are rectangular structures, e.g., a conductive segment in a metallization layer, or the like. Relative to the Y-axis, widths of structures 224(1) and 224(2) are indicated correspondingly as W1 and W2. Relative to the X-axis, lengths of structures 224(1) and 224(2) are indicated correspondingly as L1 and L2.

Example values of the lengths and widths of the rectangular structures in FIG. 2E are as follows: for structure 224(1), W1=2 and L1=5; and for structure 224(2), W2=1 and L2=3. The example values of the lengths and widths of the rectangular structures in FIG. 2E are shown in the sidefile of FIG. 3B, the GAP netlist of FIG. 4B, and the parameterized netlist of FIG. 5B.

FIGS. 2F-2H are corresponding layout diagrams, in accordance with some embodiments.

In the layout diagram of FIG. 2F, neighborhood 228 describes basic three-dimensional spatial relationships amongst cells included in neighborhood 228. As described below, such spatial relationships contribute to layout-dependent effects experienced by, among others, the cell in the center of neighborhood 228, namely cell 226(14). FIG. 2G is an exploded view of FIG. 2F.

FIG. 2H is a simplified version of FIG. 2F. Though simplified, the layout diagram of FIG. 2H is similar to layout diagram 201C in that the layout diagram 201E includes proximity-effect inducers in corresponding neighbor cells. In some embodiments, proximity-effect inducers in corresponding neighbor cells are represented by neighbor-specific proximity-effect (NSPE) parameters (discussed below) in a sidefile (discussed below) associated with the subject cell, and/or in a GAP netlist (discussed below) associated with the subject cell, and/or in a parameterized netlist (discussed below) associated with the subject cell.

In FIGS. 2F-2G, neighborhood 228 is three-dimensional and arranged as a 3×3×3 array of cells. Stated differently, relative to the Z-axis, neighborhood 228 is a stack of three neighborhoods 202F(1), 202F(2) and 202F(3). Relative to the X-axis and Y-axis, each of neighborhoods 202F(1), 202F(2) and 202F(3) is two-dimensional and arranged as corresponding 3×3 arrays of cells.

Neighborhood 228 includes: in neighborhood 202F(1), cells 226(1), 226(2), 226(3), 226(4), 226(5), 226(6), 226(7), 226(8) and 226(9); in neighborhood 202F(2), cells 226(10), 226(11), 226(12), 226(13), 226(14), 226(15), 226(16), 226(17), 226(18) and 226(19); and in neighborhood 202F(3), cells 226(20), 226(21), 226(22), 226(23), 226(24), 226(25), 226(26) and 226(27).

FIG. 2H, again, is a simplified version of FIG. 2F. Cells 230(1), 230(2) and 230(3) in FIG. 2H correspond to cells 226(5), 226(14) and 226(23) in FIGS. 2F-2G. Cell 230(2) is the subject cell and is labelled Inst_A. Relative to the Z-axis, cell 230(1) is a neighbor cell above subject cell 230(1). Cell 230(1) is labelled up_abut_A. Relative to the Z-axis, cell 230(3) is a neighbor cell below subject cell 230(1). Cell 230(3) is labelled down_abut_A.

In FIG. 2H, the proximity-effect inducers are active regions. More particularly, in some embodiments, relative to the density of active regions (not shown) in the subject cell, the density of active regions (not shown) in a neighboring cell induces the proximity-effect in the context of FIG. 2H. Cell 230(1) has an active region (AR) density of ρ_up_d. Cell 230(3) has an AR density of ρ_down_d FIGS. 3A-3C are corresponding sidefiles 332A, 332B and 332C, in accordance with some embodiments.

It is to be recalled that a neighborhood includes a group of cells, with the cell in the center of the neighborhood being the subject cell, and the other cells being neighbors (neighbor cells) with respect to the subject cell. It is also to be recalled that a neighbor cell in a neighborhood includes one or more proximity-effect inducing structures (inducers) that induce inter-cell proximity-effects in the subject cell at the center of the neighborhood, each inter-cell proximity-effect being related to a physical proximity of the inducer to the subject cell. Accordingly, each sidefile is a data structure that represents spatial relationships in a neighborhood between the subject cell and two or more of the neighbor cells. An example of a neighborhood in a layout diagram is neighborhood 202D, 202E, 202H, or the like.

Each sidefile includes at least: a first neighbor-specific proximity-effect (NSPE) parameter that describes a spatial relationship with respect to an inter-cell proximity-effect inducer in a first neighbor cell; and a second NSPE parameter that describes a spatial relationship with respect to an inter-cell proximity-effect inducer in a second neighbor cell.

Regarding FIGS. 3A-3C, in some embodiments, sidefiles are configured according to a syntax. In some embodiments, such a syntax is referred to as a grammar. In some embodiments, the syntax of the sidefiles is in a format that can be interpreted by a corresponding one of the varieties of SPICE, where SPICE is an acronym for simulation program with integrated circuit emphasis. In some embodiments, the syntax of the sidefiles is in a format that is compliant with a corresponding one of the varieties of SPICE. In some embodiments, one or more of the varieties of SPICE are included as a tool in an EDA system (see FIG. 7).

A sidefile is arranged according to rows and columns. A field is located at the intersections of a row and a column. The location of a field is identified as fld(r,c), where r represents the row number, and c represents the column number. A field contains string of text, i.e., one or more alphanumeric characters.

Regarding FIG. 3A, sidefile 332A includes NSPE parameters that correspond to neighborhood 202D of FIG. 2D. Sidefile 332A includes rows 1-10 and columns 1-4. It is to be recalled that the inducers of proximity-effects upon subject cells 218(2), 218(5) and 218(8) in neighborhood 202D are the NFET and PFET transistors (not shown in FIG. 2D but see FIG. 2C) correspondingly in neighbor cells 218(1), 218(3), 218(4), 218(6), 218(7) and 218(9). Field fld(1,1) has the text "INVDIBWP", which is assumed to be the name of neighborhood 202D of FIG. 2D.

In sidefile 332A, field fld(3,1) is a header containing the text "Subject", which indicates that each of fields fld(5,1), fld(6,1), fld(7,1), fld(8,1), fld(9,1) and fld(10,1) has text which identifies a corresponding subject cell. Each of fields fld(5,1) and fld(6,1) has the text "218(2)_Ins_A", which identifies cell 218(2) in neighborhood 202D. Each of fields fld(7,1) and fld(8,1) has the text "218(5)_Ins_B", which identifies cell 218(5) in neighborhood 202D. Each of fields fld(9,1) and fld(10,1) has the text "218(8)_Ins_C", which identifies cell 218(8) in neighborhood 202D.

In FIG. 3A, field fld(3,2) is a header having the text "Neighbor", which indicates that each of fields fld(5,2), fld(6,2), fld(7,2), fld(8,2), fld(9,2) and fld(10,2) has text which identifies a neighbor cell with respect to the subject cell identified in corresponding fields fld(5,1), fld(6,1), fld(7,1), fld(8,1), fld(9,1) and fld(10,1). Field fld(5,2) has the text "218(1)_LL_abut_A", which identifies neighbor cell 218(1) in neighborhood 202D. Field fld(6,2) has the text "218(3)_RR_abut_A", which identifies neighbor cell 218(3) in neighborhood 202D. Field fld(7,2) has the text "218(4)_LL_abut_B", which identifies neighbor cell 218(4) in neighborhood 202D. Field fld(8,2) has the text "218(6)_RR_abut_B", which identifies neighbor cell 218(6) in neighborhood 202D.

Field fld(9,2) has the text "218(7)_LL_abut_C", which identifies neighbor cell 218(7) in neighborhood 202D. Field fld(10,2) has the text "218(9)_RR_abut_C", which identifies neighbor cell 218(9) in neighborhood 202D.

In sidefile 332A, field fld(2,3) has the text "Nearest" and fld(3,3) has the text "N/P FET", which together form a header "Nearest N/P FET," which indicates that each of fields fld(5,3), fld(6,3), fld(7,3), fld(8,3), fld(9,3) and fld(10,3) has text which identifies a nearest NFET and a nearest PFET in the neighbor cell identified in corresponding fields fld(5,2), fld(6,2), fld(7,2), fld(8,2), fld(9,2) and fld(10,2).

In FIG. 3A, field fld(5,3) has the text "N3:P8", which indicates that the nearest NFET in cell 218(1) has a distance 219N of value 3, and the nearest PFET in cell 218(1) has a distance 219P of value 8. Again, neighborhood 202D is shown with example distance values, where units for, as well as values for, the corresponding instances of distances 219N and 219P are determined by the design rules and scale of the corresponding semiconductor process technology node. Field fld(6,3) has the text "N7:P7", which indicates that the nearest NFET in cell 218(3) has a distance 219N of value 7, and the nearest PFET in cell 218(3) has a distance 219P of value 7. Field fld(7,3) has the text "N7:P5", which indicates that the nearest NFET in cell 218(4) has a distance 219N of value 7, and the nearest PFET in cell 218(4) has a distance 219P of value 5. Field fld(8,3) has the text "N8:P8", which indicates that the nearest NFET in cell 218(6) has a distance 219N of value 8, and the nearest PFET in cell 218(6) has a distance 219P of value 8. Field fld(9,3) has the text "N4:P4", which indicates that the nearest NFET in cell 218(7) has a distance 219N of value 4, and the nearest PFET in cell 218(7) has a distance 219P of value 4.

Field fld(10,3) has the text "N7:P4", which indicates that the nearest NFET in cell 218(9) has a distance 219N of value 7, and the nearest PFET in cell 218(9) has a distance 219P of value 4.

In some embodiments of sidefile 332A, field fld(2,3) has the text "Left-nearest" and fld(3,3) has the text "N/P FET", which together form a header "Left-nearest N/P FET," which indicates that each of fields fld(5,4), fld(6,4), fld(7,4), fld(8,4), fld(9,4) and fld(10,4) has text which identifies an NFET (not shown in FIG. 2D) and a PFET (not shown in FIG. 2D) in the neighbor cell identified in corresponding fields fld(5,2), fld(6,2), fld(7,2), fld(8,2), fld(9,2) and fld(10,2) which is nearest with respect to a left boundary of the subject cell identified in corresponding fields fld(5,1), fld(6,1), fld(7,1), fld(8,1), fld(9,1) and fld(10,1). In some embodiments of sidefile 332A, field fld(2,4) has the text "Right-nearest" and fld(3,4) has the text "N/P FET", which together form a header "Right-nearest N/P FET," which indicates that each of fields fld(5,4), fld(6,4), fld(7,4), fld(8,4), fld(9,4) and fld(10,4) has text which identifies an NFET (not shown in FIG. 2D) and a PFET (not shown in FIG. 2D) in the neighbor cell identified in corresponding fields fld(5,2), fld(6,2), fld(7,2), fld(8,2), fld(9,2) and fld(10,2) which is nearest with respect to a right boundary of the subject cell identified in corresponding fields fld(5,1), fld(6,1), fld(7,1), fld(8,1), fld(9,1) and fld(10,1).

In FIG. 3A, field fld(5,4) has the text "N8:P10", which indicates that the next-nearest NFET in cell 218(1) has a distance 219N of value 8, and the next-nearest PFET in cell 218(1) has a distance 219P of value 10. Field fld(6,4) has the text "N9:P11", which indicates that the next-nearest NFET in cell 218(3) has a distance 219N of value 9, and the next-nearest PFET in cell 218(3) has a distance 219P of value 11. Field fld(7,4) has the text "N10:P7", which indicates that the next-nearest NFET in cell 218(4) has a distance 219N of value 10, and the next-nearest PFET in cell 218(4) has a distance 219P of value 7. Field fld(8,4) has the text "N9:P12", which indicates that the next-nearest NFET in cell 218(6) has a distance 219N of value 9, and the next-nearest PFET in cell 218(6) has a distance 219P of value 12. Field fld(9,4) has the text "N8:P8", which indicates that the next-nearest NFET in cell 218(7) has a distance 219N of value 8, and the next-nearest PFET in cell 218(7) has a distance 219P of value 8. Field fld(10,4) has the text "N11:P9", which indicates that the next-nearest NFET in cell 218(9) has a distance 219N of value 11, and the next-nearest PFET in cell 218(9) has a distance 219P of value 9.

In sidefile 332A, each of the following combinations of fields represents an NSPE parameter: fields fld(5,1), fld(5,2) and fld(5,3); fields fld(6,1), fld(6,2) and fld(6,3); fields fld(7,1), fld(7,2) and fld(7,3); fields fld(8,1), fld(8,2) and fld(8,3); fields fld(9,1), fld(9,2) and fld(9,3); fields fld(10,1), fld(10,2) and fld(10,3); fields fld(5,1), fld(5,2) and fld(5,4); fields fld(6,1), fld(6,2) and fld(6,4); fields fld(7,1), fld(7,2) and fld(7,4); fields fld(8,1), fld(8,2) and fld(8,4); fields fld(9,1), fld(9,2) and fld(9,4); and fields fld(10,1), fld(10,2) and fld(10,4). Thus, sidefile 332A includes at least: a first NSPE parameter that describes a spatial relationship with respect to an inter-cell proximity-effect inducer in a first neighbor cell; and at least a second NSPE parameter that describes a spatial relationship with respect to an inter-cell proximity-effect inducer in a second neighbor cell.

Regarding FIG. 3B, sidefile 332B includes NSPE parameters that correspond to neighborhood 202E of FIG. 2E. Sidefile 332B includes rows 1-5 and columns 1-3. It is to be recalled that the inducers of proximity-effects upon subject cell 222(2) in neighborhood 202E are the rectangular structures 224(1) and 224(2) correspondingly in neighbor cells 222(1) and 222(2).

Field fld(1,1) is a header having the text "#Cellname", which indicates that each of fields fld(3,1), fld(4,1) and fld(5,1) has text which identifies a corresponding subject cell. Field fld(3,1) has the text "222(2)_Inst_A", which identifies cell 222(2) in neighborhood 202E, with cell 222(2) being the subject cell of neighborhood 202E. Field fld(4,1) has the text "222(1)_TT_abut_A", which identifies cell 222(1) in neighborhood 202E, with cell 222(1) being the neighbor which abuts the top side of subject cell 222(2). Field fld(5,1) has the text "222(3)_BB_abut_A", which identifies cell 222(3) in neighborhood 202E, with cell 222(3) being the neighbor which abuts the bottom side of subject cell 222(2).

In FIG. 3B, field fld(1,2) is a header having the text "W", which indicates that each of fields fld(4,2) and fld(5,2) has text which identifies a corresponding width of a rectangular structure in the corresponding neighbor cell, the rectangular structure being an inducer of a proximity-effect on the subject cell.

Field fld(4,2) has the text "2", which indicates a width of distance 2, and which is the value of distance W1 of structure 224(1) in cell 222(1). Field fld(5,2) has the text "1", which indicates a width of distance 1, and which is the value of distance W2 of structure 224(2) in cell 222(3).

Field fld(1,3) is a header having the text "L", which indicates that each of fields fld(3,3), fld(4,3) and fld(5,3) has text which identifies a corresponding length of a rectangular structure in the corresponding neighbor cell, the rectangular structure being an inducer of a proximity-effect on the subject cell.

Field fld(4,3) has a width of distance 5, which is the value of distance L1 of structure 224(1) in cell 222(1). Field fld(5,3) has a width of distance 3, which is the value of distance L2 of structure 224(2) in cell 222(3).

In sidefile 332B, each of the following combinations of fields represents an NSPE parameter: fields fld(4,1), fld(4,2) and fld(4,3); and fld(5,1), fld(5,2) and fld(5,3). Thus, sidefile 332B includes: a first NSPE parameter that describes a spatial relationship with respect to an inter-cell proximity-effect inducer in a first neighbor cell; and a second NSPE parameter that describes a spatial relationship with respect to an inter-cell proximity-effect inducer in a second neighbor cell.

In some embodiments, fields fld(3,2) and fld(3,3) are provided with values because there are circumstances in which cell 222(2) is a neighbor rather than the subject cell. Accordingly, in FIG. 3B, field fid (3,2) has a width of distance 2 and field fld(3,3) has a length of distance 2.

Regarding FIG. 3C, sidefile 332C includes NSPE parameters that correspond to neighborhood 202H of FIG. 2H. Sidefile 332C includes rows 1-5 and columns 1-3. It is to be recalled that the inducers of proximity-effects upon subject cell 230(2) in neighborhood 202E are the active regions (not shown) correspondingly in neighbor cells 230(1) and 230(2). More particularly, in some embodiments, relative to the density of active regions (not shown) in the subject cell, the density of active regions (not shown) in a neighboring cell induces the proximity-effect in the context of FIG. 2H. Field fld(1,1) is a header having the text "#Cellname", which indicates that each of fields fld(3,1), fld(4,1) and fld(5,1) has text which identifies a corresponding subject cell.

In FIG. 3C, field fld(3,1) has the text "230(2)_Inst_A", which identifies cell 230(2) in neighborhood 202H, with cell 230(2) being the subject cell of neighborhood 202H. Field fld(4,1) has the text "230(1) up_abut_A", which identifies cell 230(1) in neighborhood 202H, with cell 230(1) being the neighbor which abuts the upper side of subject cell 230(2), where upper connotes direction relative to the Z-axis. Field fld(5,1) has the text "230(3)_down_abut_A", which identifies cell 230(3) in neighborhood 202H, with cell 230(3) being the neighbor which abuts the lower side of subject cell 230(2), where lower connotes direction relative to the Z-axis.

Field fld(1,2) is a header having the text "density", which indicates that each of fields fld(4,2) and fld(5,2) has text which identifies a corresponding density of active regions (AR density) in the corresponding neighbor cell, the density of active regions being an inducer of a proximity-effect on the subject cell.

In FIG. 3C, field fld(4,2) has the text "0.50", which indicates a density of 0.50, and which is the value of AR density $\rho\_up\_d$ of AR regions (not shown) in cell 230(1). Field fld(5,2) has the text "0.20", which indicates a density of 0.20, and which is the value of AR density $\rho\_down\_d$ of AR regions (not shown) in cell 230(3). No text is provided in field fld(3,2) because row 3 describes the subject cell and column 2 identifies the density of AR regions in neighbor cells, i.e., the subject cell is not a neighbor to itself.

In sidefile 332C, each of the following combinations of fields represents an NSPE parameter: fields fld(4,1) and fld(4,2); and fld(5,1) and fld(5,2). Thus, sidefile 332C includes: a first NSPE parameter that describes a first NSPE parameter that describes a spatial relationship with respect to an inter-cell proximity-effect inducer in a first neighbor cell; and a second NSPE parameter that describes a spatial relationship with respect to an inter-cell proximity-effect inducer in a second neighbor cell.

FIGS. 4A-4C are corresponding globally-variable parameterized (GAP) netlists 334A, 334B and 334C, in accordance with some embodiments.

In general, a proximity effect is an example of a layout-dependent effect. For purposes of discussing FIGS. 4A-4C, there are two types of proximity effects. A first type of proximity effect occurs where a first given structure in a given cell is a proximity-effect inducing structure (inducer) that induces a proximity-effect in a second given structure in the same given cell. The first type of proximity effect is referred to as an intra-cell proximity effect.

A second type of proximity effect occurs where a first given structure in a given first cell is a proximity-effect inducer that induces a proximity-effect in a second given structure in a second given cell. The second type of proximity effect is referred to as an inter-cell proximity effect. The proximity-effect is related to a physical proximity of the inducer, i.e., the first given structure, to the second given structure.

FIG. 4A relates to an intra-cell proximity-effect. Each of FIGS. 4B-4C relates to a corresponding inter-cell proximity effect.

Regarding FIGS. 4A-4C, each of corresponding GAP netlists 334A, 334B and 334C is a data structure that represents intra-cell spatial relationships (FIG. 4A) or inter-cell spatial relationships (FIGS. 4B-4C).

In general, each GAP netlist includes one or more proximity-effect-inducer (PEI) parameters that describes a spatial relationship with respect to a proximity-effect inducer. Regarding FIGS. 4A-4C, in some embodiments, GAP netlists are configured according to a syntax. In some embodiments, such a syntax is referred to as a grammar. In some embodiments, the syntax of the GAP netlists is in a format that can be interpreted by a corresponding one of the varieties of SPICE. In some embodiments, the syntax of the GAP netlists is in a format that is compliant with a corresponding one of the varieties of SPICE. In some embodiments, one or more of the varieties of SPICE are included as a tool in an EDA system (see FIG. 7).

A GAP netlist is arranged according to rows. Each rows include one or more fields. A field contains string of text, i.e., one or more alphanumeric characters.

Regarding FIG. 4A, an example of an intra-cell proximity-effect is the effect on a transistor in a given cell due to scattering from the edge of a photoresist used to produce the corresponding well in the given cell. During the implant process, some of the ions scattered from the edge of photoresist are implanted in the semiconductor surface near the mask edge, which changes the threshold voltage of proximal devices. In some embodiments, such a proximity-effect is known as well proximity effect (WPE). The result of the WPE is the formation of a graded channel due to an NFET or PFET placed too close to a corresponding well edge. The graded channel causes a shift of electrical characteristics of the NFET or PFET. The WPE is a function of the distance of the NFET or PFET from the corresponding mask edge.

In GAP netlist 334A, row 1 includes one field which contains the text "<GAP netlist plus proximity-effect-inducer (PEI) parameters>", which is a comment that provides an overall description of GAP netlist 334A.

In FIG. 4A, row 2 includes eight fields as follows. The first field contains the text ".subckt", which indicates the beginning of the definition of GAP netlist 334A. The second field contains the text "INVD1BWP", which is assumed to be the name of neighborhood 202D of FIG. 2D. The third field contains the text "IN1", which represents a first external node, i.e., input node, of neighborhood 202D. The fourth field contains the text "OUT3", which represents a second external node, i.e., output node, of neighborhood 202D.

In row 2 of GAP netlist 332A, the fifth field contains the text "L0=3", which indicates that global PEI parameter L0 has a value of 3. In some embodiments, global PEI parameter is a variable common to a given cell and one or more additional cells in the layout diagram, e.g., in the given neighborhood. In FIG. 4A, global PEI parameter L0 is common to two local PEI parameters in row 3, as discussed below. The sixth field contains the text "L1=3", which indicates that global PEI parameter L1 has a value of 3. In FIG. 4A, global PEI parameter L1 is common to two local PEI parameters in row 3, as discussed below.

Also in row 2 of GAP netlist 332A, the seventh field contains the text "R0=3", which indicates that global PEI parameter R0 has a value of 3. In FIG. 4A, global PEI parameter R0 is common to two local PEI parameters in row 4, as discussed below. The eighth field contains the text "R1=3", which indicates that global PEI parameter R1 has a value of 3. In FIG. 4A, global PEI parameter R1 is common to two local PEI parameters in row 4, as discussed below.

In FIG. 4A, row 3 includes nine fields, of which the eighth field includes the text "enviro_scatr_a #="f(R1)"", which is a local PEI parameter that is based on global PEI parameter R1. In some embodiments, a local PEI parameter is specific to a corresponding given cell, i.e., is not common to another cell in the layout diagram. An example of enviro_scatr_a # is sca2, e.g., sca2=4.2e-08+L0*4.5e-8; sca2 is briefly discussed below. The ninth field includes the text "enviro_scatr_b #="f(L1)"", which is a local PEI parameter that is based on the global PEI parameter L1. An example of enviro_scatr_b # is scb2, e.g., scb2=4.2e-08+L1*4.5e-8; scb2 is briefly discussed below.

Row 4 includes nine fields, of which the eighth field includes the text "enviro_scatr_a #="f(R0)"", which is a local PEI parameter that is based on global PEI parameter R0. An example of enviro_scatr_a # is sca2, e.g., sca2=4.2e-08+R0*4.5e-8; again, sca2 is briefly discussed below. The ninth field includes the text "enviro_scatr_b #="f(L0)"", which is a local PEI parameter that is based on the global PEI parameter L0. An example of enviro_scatr_b # is scb2, e.g., scb2=4.2e-08+R1*4.5e-8; again, scb2 is briefly discussed below.

In some embodiments, sca2 is based at least in part on an integral of an expected value of a first order distribution for scattered well dopants. In some embodiments, the first order distribution for scattered well dopants is a figure of merit (FOM) used alone or to describe a proximity effect induced by a well (well-proximity effect), the latter being an example of a layout-dependent effect. In some embodiments, the first order distribution for scattered well dopants is the sole FOM used. In some embodiments, the first order distribution for scattered well dopants is used in combination with other FOMs. In some embodiments, scb2 is based at least in part on an integral of an expected value of a second order distribution for scattered well dopants. In some embodiments, the second order distribution for scattered well dopants is a FOM used alone or to describe a well-proximity effect, the latter being an example of a layout-dependent effect. In some embodiments, the second order distribution for scattered well dopants is the sole FOM used. In some embodiments, the second order distribution for scattered well dopants is used in combination with other FOMs, e.g., the first order distribution for scattered well dopants, or the like.

In FIG. 4A, row 5 includes one field that contains the text ".ends", which indicates the end of the definition of GAP netlist 334A.

Regarding GAP netlist 334B of FIG. 4B, an example of an inter-cell proximity-effect is the effect of a rectangular structure in a neighbor cell upon a corresponding subject cell, e.g., as described in the context of FIG. 2E. Row 2 includes eight fields of which the fifth field contains the text "GW0=0", which indicates that global PEI parameter GW0 has a value of 0. The sixth field contains the text "GL0=0", which indicates that global PEI parameter GL1 has a value of 0. The seventh field contains the text "GW1=0", which indicates that global PEI parameter GW1 has a value of 0. The eighth field contains the text "GL1=0", which indicates that global PEI parameter GL1 has a value of 0.

Regarding FIG. 4B, it describes content included in cell Inst_A 222(2). Row 2 of FIG. 4B shows Inst_A 222(2) to be an INVD1BWP type of cell. Rows 3 and 4 correspondingly identify components XMM1 (see FIG. 4A) and XMM2 (see FIG. 4A) included in cell Inst_A 222(2).

Row 3 of FIG. 4B includes seven fields, of which the seventh field includes the text "enviro_rktng0="f(GW0, GL0)"", which is a local PEI parameter that is based on global PEI parameters GW0 and GL0. In some embodiments, enviro_rktng0="f(GW0,GL0)" represents a structure in a cell in terms of: a width of the structure, GW0, relative to the Y-axis; and a length of the structure, GL0, relative to the X-axis.

Row 4 of FIG. 4B includes seven fields, of which the seventh field includes the text "enviro_rktng1="f(GW1, GL1)"", which is a local PEI parameter that is based on global PEI parameters GW1 and GL1. In some embodiments, enviro_rktng1="f(GW0,GL0)" represents a structure in a cell in terms of: a width of the structure, GW1, relative to the Y-axis; and a length of the structure, GL1, relative to the X-axis.

Regarding FIG. 4B, in some embodiments, the PEI parameters of GAP netlist 334B are referred to as footprint parameters because they relate to areas consumed by rectangular structures. In some embodiments, the structures represented by enviro_rktng0="f(GW0,GL0)" and enviro_rktng1="f(GW1,GL1)" are corresponding structures in corresponding neighbor cells which induce corresponding proximity effects upon a given subject cell, and which are the nearest proximity-effect-inducers to a given subject cell. In the example of FIG. 4B, in row 3, the structure represented by enviro_rktng0="f(GW0,GL0)" corresponds to structure 224(1) in cell TT_abut_A 222(1) in FIG. 2E, and wherein structure 224(1) is the proximity-effect-inducing structure in cell TT_abut_A nearest to subject cell Inst_A 222(2). In the example of FIG. 4B, in row 4, the structure represented by enviro_rktng1="f(GW1G,L1)" corresponds to structure 224(2) in cell BB_abut_A 222(3) in FIG. 2E, and wherein structure 224(2) is the proximity-effect-inducing structure in cell BB_abut_A nearest to subject cell Inst_A.

Regarding GAP netlist 334C of FIG. 4C, an example of an inter-cell proximity-effect is the effect of active region density in a neighbor cell upon a corresponding subject cell, e.g., as described in the context of FIG. 2H. In some embodiments, the PEI parameters of GAP netlist 334C are referred to as AR-density parameters. Row 2 includes six fields of which the fifth field contains the text "ρ_up_d=0.1", which indicates that overlying density global PEI parameter ρ_up_d has a value of 0.1. The sixth field contains the text "ρ_down_d=0.1", which indicates that underlying density global PEI parameter ρ_down_d has a value of 0.1.

In FIG. 4C, row 3 includes seven fields, of which the seventh field includes the text "enviro_ρ="f(ρ_up_d)"", which is a local PEI parameter that is based on global PEI parameter ρ_up_d. In some embodiments, enviro_ρ="f(ρ_up_d)" represents a density of AR regions in an overlying cell. Row 4 includes seven fields, of which the seventh field includes the text "enviro_ρ="f(ρ_down_d)"", which is a local PEI parameter that is based on global PEI parameter ρ_down_d. In some embodiments, enviro_ρ="f(ρ_down_d)" represents a density of AR regions in an underlying cell.

In some embodiments, differences in active region density between neighboring cells affects the results of chemical mechanical polishing (CMP), with greater differences in active region densities between neighboring cells resulting in poorer CMP results, and smaller differences in active region densities between neighboring cells resulting in better CMP results.

In the example of FIG. 4C, in row 3, the neighbor cell whose density of active regions is represented by enviro_ρ="f(ρ_up_d)" is cell up_abut_A 230(1) in FIG. 2H. In row 4, the neighbor cell whose density of active regions is represented by enviro_ρ="f(ρ_downp_d)" is cell down_abut_A 230(3) in FIG. 2H.

FIGS. 5A-5C are corresponding local parameterized (GAP) netlists 336A, 336B and 336C, in accordance with some embodiments.

Netlists 336A, 336B and 336C correspond to GAP netlists 334A, 334B and 334C of corresponding FIGS. 4A-4C. Accordingly, netlists 336A, 336B and 336C correspondingly relate to FIGS. 2D, 2E and 2H.

In netlist 336A of FIG. 5A, each of rows 2-4 recites local PEI parameters GL0, GL1, GR0 and GR1. However, each of rows 2-4 assigns different values to corresponding local PEI parameters GL0, GL1, GR0 and GR1 based on the corresponding values of distances 219N and 219P shown in FIG. 2D. Mindful that the orientation of triangle 220 in cell 218(5) is in the lower right corner, and the orientation of triangle 220 in cell 218(8) is in the upper right corner, each of cells 218(5) and 218(8) is mirror symmetric relative to the default orientation (triangle 220 in lower left corner) with respect to the Y-axis. Accordingly, the values assigned to corresponding local PEI parameters GL0, GL1, GR0 and GR1 in each of rows 3-4 reflect the mirror symmetric orientations of cells 218(5) and 218(8).

In netlist 336B of FIG. 5B, row 2 recites local PEI parameters W0, L0, W1 and L1, and assigns values thereto. In particular, the values assigned to W0 and L0 in FIG. 5B correspond to the values assigned to width W in field fld(4,3) and length L in field fld(4,4) in sidefile 332B. And the values assigned to W1 and L1 in FIG. 5B correspond to the values assigned to width W in field fld(4,3) and length L in field fld(5,4) in sidefile 332B.

In netlist 336C of FIG. 5C, row 2 recites local PEI parameters up_d and down_d, and assigns values thereto. In particular, the values assigned to up_d and down_d in FIG. 5C correspond to the values assigned to density in field fld(4,2) field fld(5,2) in sidefile 332C.

Figure 6A:
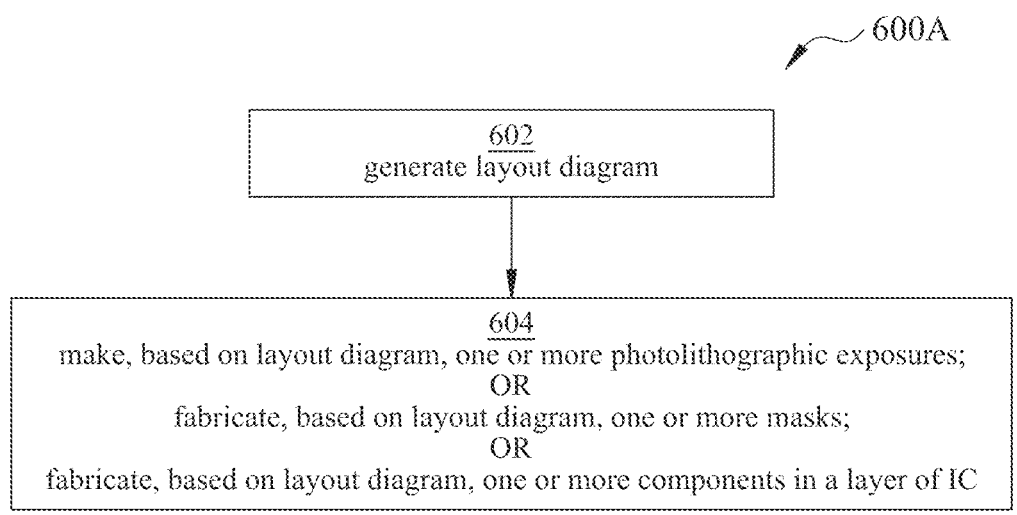
FIGS. 6A, 6B, 6C and 6D are corresponding flowcharts of methods of manufacturing a semiconductor device, in accordance with some embodiments.

FIG. 6A is a flowchart of a method 600A of manufacturing a semiconductor device, in accordance with some embodiments.

Method 600A is implementable, for example, using EDA system 700 (FIG. 7, discussed below) and an integrated circuit (IC), manufacturing system 800 (FIG. 8, discussed below), in accordance with some embodiments. Examples of a semiconductor device which can be manufactured according to method 600A include semiconductor device 100 of FIG. 1A, semiconductor devices corresponding to various ones of the layout diagrams disclosed herein, or the like.

In FIG. 6A, method 600A includes blocks 602-604. At block 602, a layout diagram is generated which, among other things, includes one or more of layout diagrams disclosed herein, or the like. Block 602 is implementable, for example, using EDA system 700 (FIG. 7, discussed below), in accordance with some embodiments. More particularly, block 602 includes generating shapes corresponding to structures in a semiconductor diagram which are to be represented. From block 602, flow proceeds to block 604.

At block 604, based on the layout diagram, at least one of (A) one or more photolithographic exposures are made or (B) one or more semiconductor masks are fabricated or (C) one or more components in a layer of a semiconductor device are fabricated is done. See discussion below of FIG. 8.

Figure 6B:
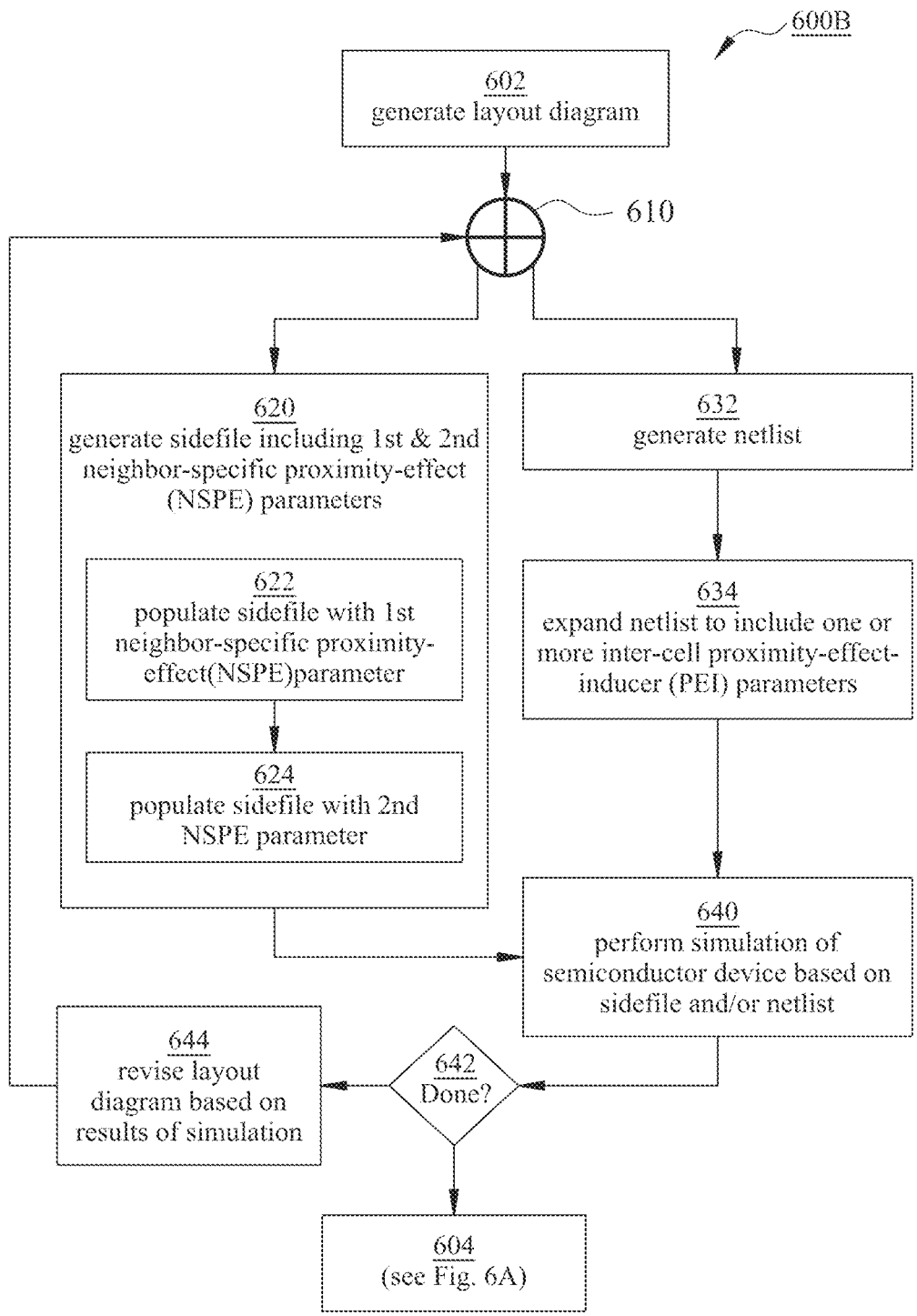
Figure 6C:
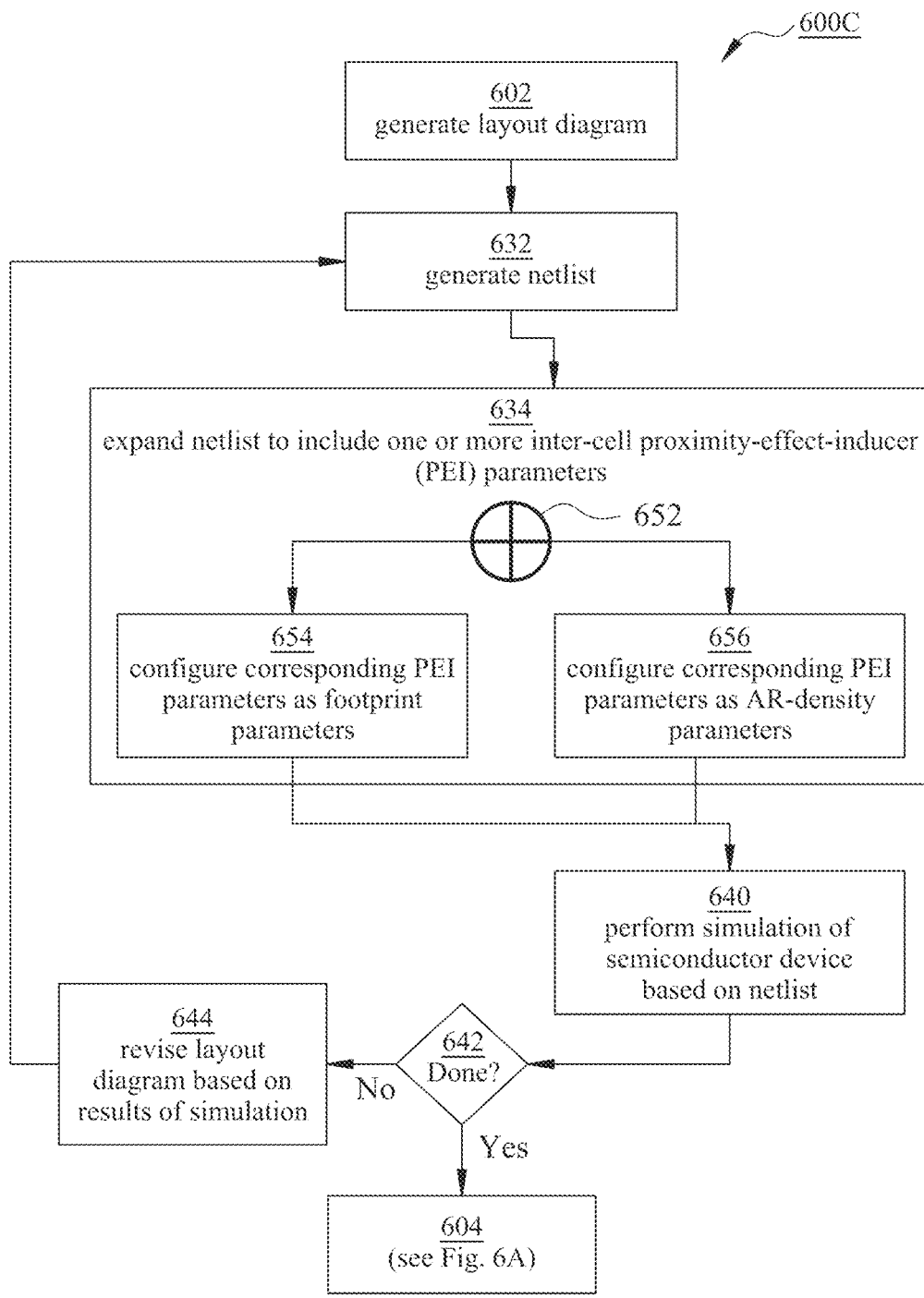

FIGS. 6B-6C are flowcharts of corresponding methods 600B-600C of manufacturing a semiconductor device, in accordance with some embodiments.

Methods 600B-600C are corresponding versions of method 600A of FIG. 6A.

Each of methods 600B-600C is implementable, for example, using EDA system 700 (FIG. 7, discussed below) and an integrated circuit (IC), manufacturing system 800 (FIG. 8, discussed below), in accordance with some embodiments. Examples of a semiconductor device which can be manufactured according to corresponding methods 600B-600C include semiconductor device 100 of FIG. 1A, semiconductor devices corresponding to various ones of the layout diagrams disclosed herein, or the like.

Regarding FIG. 6B, in addition to blocks 602 and 604 of FIG. 6A, method 600B further includes blocks 610, 620-624, 632-634, and 640-644. At block 602, a layout diagram is generated, as discussed above in the context of FIG. 6A. From block 602 in FIG. 6B, flow can proceed to either block 620 or block 632, or to both, as indicated by the OR-flow symbol 610.

At block 620, a sidefile is generated which includes first and second neighbor-specific proximity-effect (NSPE) parameters. Block 620 includes blocks 622-624. At block 622, the sidefile is populated with a first NSPE parameter. From block 622, flow proceeds to block 624. At block 624, the sidefile is populated with a second NSPE parameter. Examples of NSPE parameters are found in each of rows 5-10 in sidefile 332A of FIG. 3A, each of rows 4-5 in sidefile 332B of FIG. 3C, each of rows 4-5 in sidefile 332C of FIG. 3C, or the like. From block 620 flow proceeds to block 640 (discussed below).

From OR-flow symbol 610, flow alternately proceeds to block 632. At block 632, a netlist is generated. In some embodiments, an example of the netlist generated at block 632 is a conventional netlist. From block 632, flow proceeds to block 634.

At block 634, the otherwise conventional netlist is expanded to include one or more inter-cell proximity-effect-inducer (PEI) parameters, resulting in a GAP netlist. Examples of inter-cell PEI parameters are found in each of rows 3-4 of GAP netlist 334B of FIG. 4B, each of rows 3-4 of GAP netlist 334C of FIG. 4C, or the like. From block 634, flow proceeds to block 640.

At block 640, a simulation of the semiconductor device based on the sidefile generated in block 620 and the GAP netlist generated in block 634 is performed. To reiterate, each of the sidefile generated in block 620 and the GAP netlist generated in block 634 corresponds to the layout diagram generated in block 602. From block 640, flow proceeds to decision block 642.

At decision block 642, it is determined whether the results of the simulation are acceptable. If the results are acceptable, then flow proceeds from the yes-exit of decision block 642 to block 604 (discussed above). If the results are not acceptable, then flow proceeds from the no-exit of decision block 642 to block 644.

At block 644, the layout diagram is revised so as to improve results of a subsequent simulation. From block 644, flow proceeds to loop back up to OR-flow symbol 610 (discussed above).

Regarding FIG. 6C, it is a variation of FIG. 6B. In FIG. 6C, in addition to blocks 602 and 604 of FIG. 6A, method 600C further includes blocks 632-634, 652-654 and 640-644. At block 602, a layout diagram is generated, as discussed above in the context of FIG. 6A. From block 602 in FIG. 6C, flow can proceed to block 634.

At block 634, the otherwise conventional netlist generated in block 632 is expanded to include one or more inter-cell proximity-effect-inducer (PEI) parameters, resulting in a GAP netlist, as discussed above in the context of FIG. 6B. However, in method 600C of FIG. 6C, block 634 includes blocks 652-656.

In block 634, flow can proceed to either block 654 or block 656, or to both, as indicated by the OR-flow symbol 652. At block 654, corresponding PEI parameters are configured as footprint parameters. Examples of footprint parameters include the PEI parameters of GAP netlist 334B of FIG. 4B, or the like. From block 654, flow exits block 634.

From OR-flow symbol 652, flow alternately proceeds to block 656. At block 656, corresponding PEI parameters are configured as AR-density parameters. Examples of AR-density parameters include the PEI parameters of GAP netlist 334C of FIG. 4C. From block 656, flow exits block 634.

From block 634 of FIG. 6C, flow proceeds to blocks 640-644 and block 604, as discussed above in the context of FIG. 6B.

Figure 6D:
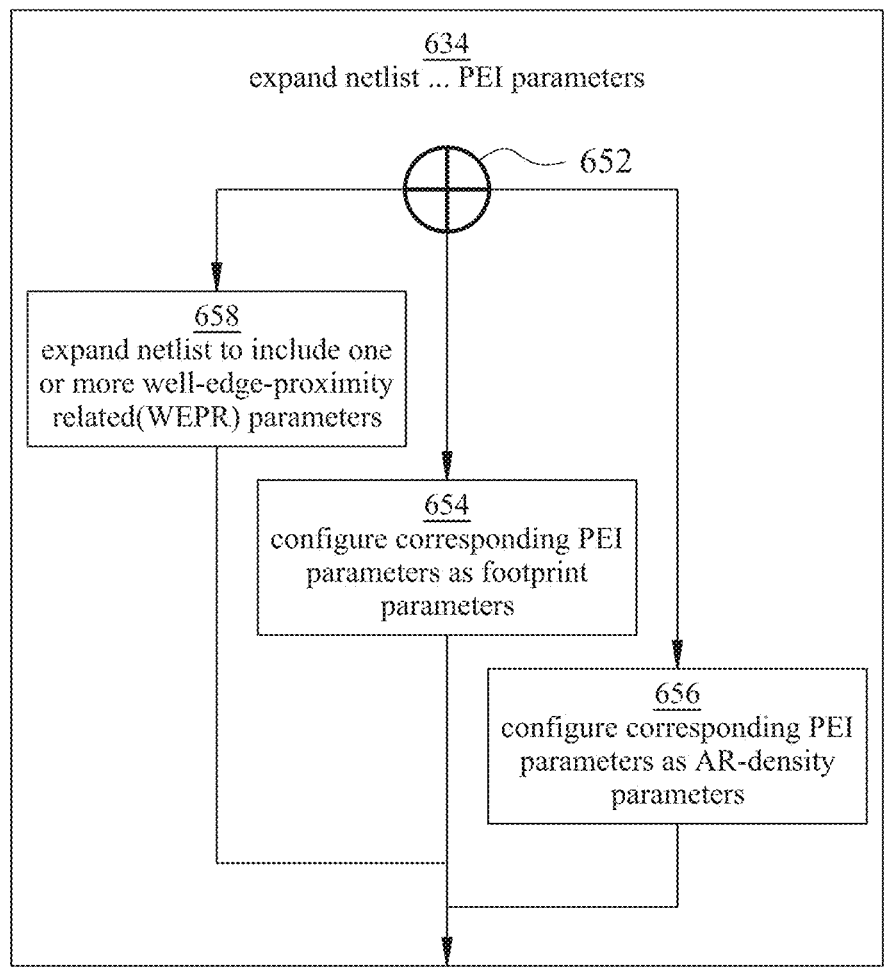

In FIG. 6D, block 634 is shown as including an additional block as compared to block 634 of FIG. 4C. In particular, in FIG. 6D, block 634 not only includes blocks 654 and 656, but further includes a block 658.

From OR-flow symbol 652, flow alternately proceeds to block 658. At block 658, the otherwise conventional netlist is expanded to include one or more well-edge-proximity-related (WEPR) parameters, resulting in a GAP netlist. Examples of WEPR parameters are found in each of rows and inter-cell PEI parameters are found in each of rows 3-4 of GAP netlist 334A of FIG. 3A, or the like. From block 658, flow exits block 634.

Figure 7:
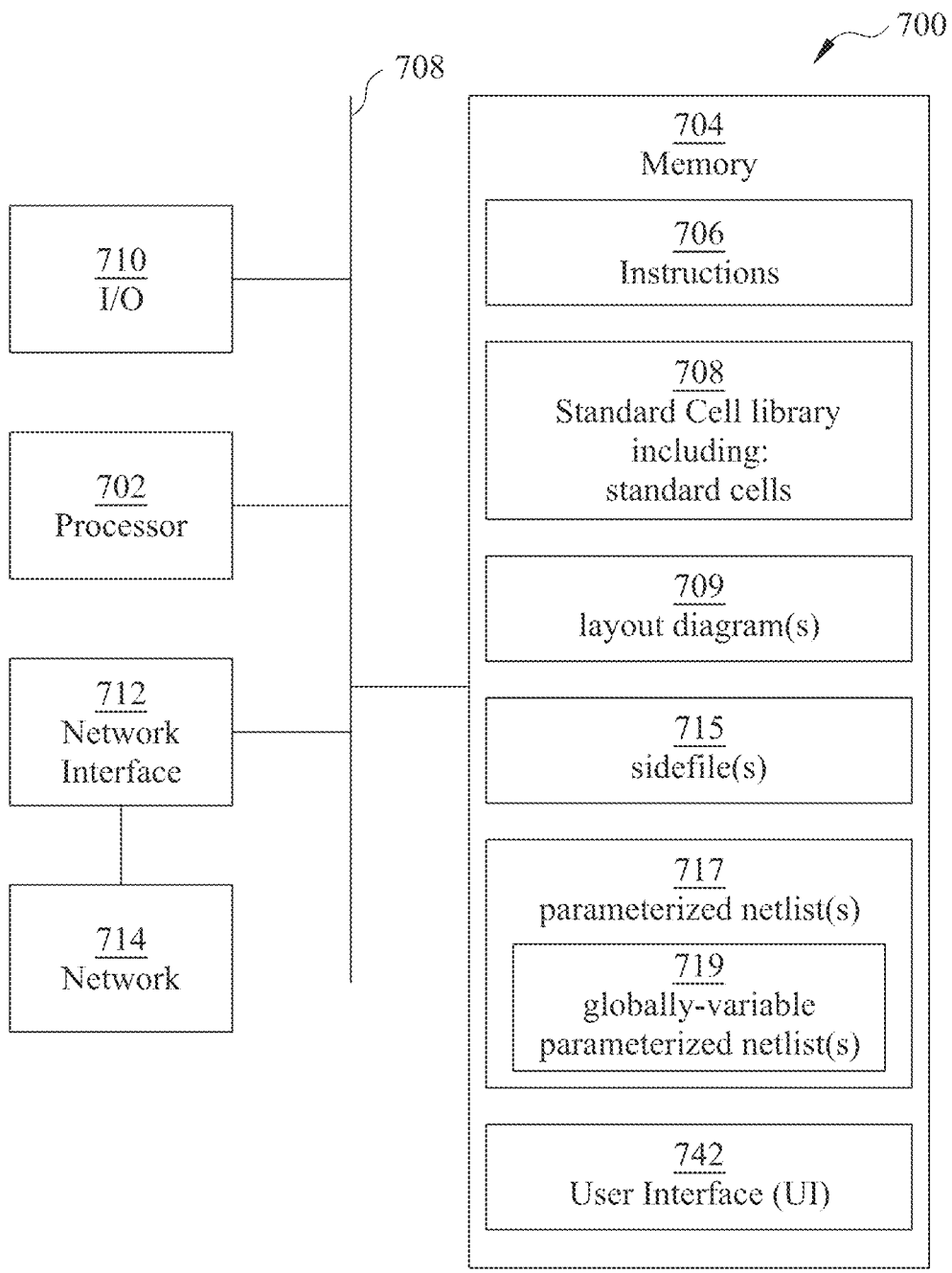
FIG. 7 is a block diagram of an electronic design automation (EDA) system in accordance with some embodiments.

FIG. 7 is a block diagram of an electronic design automation (EDA) system 700 in accordance with some embodiments.

In some embodiments, EDA system 700 includes an automatic placement and routing (APR) system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein. In one or more embodiments, storage medium 704 stores one or more layout diagrams 709 corresponding to one or more layouts disclosed herein. In one or more embodiments, storage medium 704 stores one or more sidefiles 715 corresponding to one or more cell neighborhoods disclosed herein. In one or more embodiments, storage medium 704 stores one or more parameterized netlists 717 corresponding to one or more cell neighborhoods disclosed herein. In one or more embodiments, storage medium 704 stores one or more globally-variable parameterized (GAP) netlists 719 corresponding to one or more cell neighborhoods disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
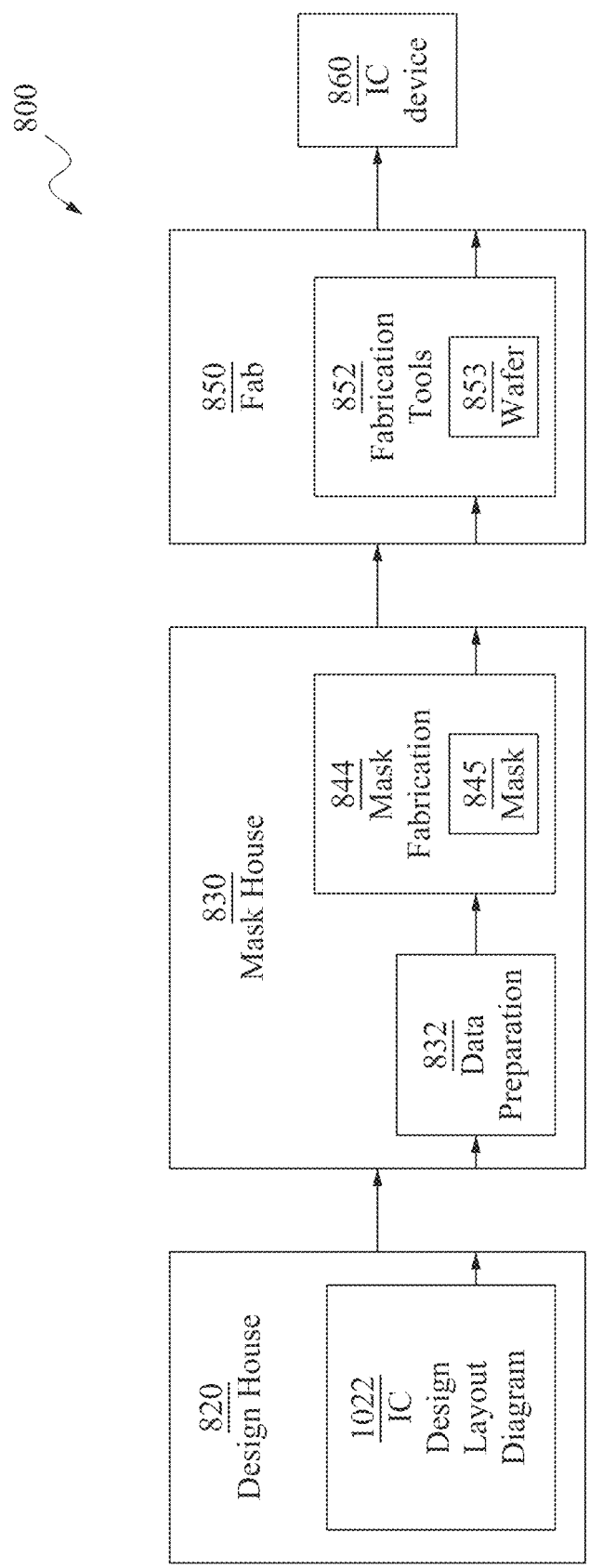
FIG. 8 is a block diagram of an integrated circuit (IC) manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator (fab) 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file (RDF). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for photolithographic implementation effects during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some aspects, a method of manufacturing a semiconductor device includes a corresponding layout diagram being stored on a non-transitory computer-readable medium, the layout diagram being arranged relative to first and second perpendicular directions, the layout diagram including cells such that, for a subset of the cells, each subject one of the cells (subject cell) in the subset has a neighborhood including first and second neighbor cells on corresponding first and second sides of the subject cell relative to the first direction, the method comprising: for each subject cell in the subset, generating a sidefile which represents neighborhood-specific proximity-effect information; and wherein: for each cell in the subset of the cells, the generating a sidefile including: populating the sidefile with a first neighbor-specific proximity-effect (NSPE) parameter corresponding to an inter-cell proximity-effect induced by the first neighbor cell; and populating the sidefile with a second NSPE parameter corresponding to an inter-cell proximity-effect induced by the second neighbor cell.

In some embodiments, relative to the first direction, the first NSPE parameter represents a first distance from the first side of the subject cell to a first structure in the first neighbor cell that has a proximity effect upon the subject cell; and relative to the first direction, the second NSPE parameter represents a second distance from the second side of the subject cell to a second structure in the second neighbor cell that has a proximity effect upon the subject cell.

In some embodiments, the first structure is a transistor; or the second structure is a transistor.

In some embodiments, the neighborhood of each subject cell in the subset further includes: third and fourth neighbor cells on corresponding third and fourth sides of the subject cell relative to the second direction; and the generating a sidefile further includes: populating the sidefile with a third NSPE parameter corresponding to the third neighbor cell; and populating the sidefile with a fourth NSPE parameter corresponding to the third neighbor cell.

In some embodiments, relative to the second direction, the third NSPE parameter represents a third distance from the third side of the subject cell to a third structure in the third neighbor cell that has a proximity effect upon the subject cell; and relative to the second direction, the fourth NSPE parameter represents a fourth distance from the fourth side of the subject cell to a fourth structure in the fourth neighbor cell that has a proximity effect upon the subject cell.

In some embodiments, the neighborhood of each subject cell in the subset further includes: fifth sixth, seventh and eighth neighbor cells on corresponding first, second, third and fourth diagonal-corners of the subject cell relative to the first and second directions; and the generating a sidefile further includes: populating the sidefile with a fifth NSPE parameter corresponding to the fifth neighbor cell; populating the sidefile with a sixth NSPE parameter corresponding to the fifth neighbor cell; populating the sidefile with a seventh NSPE parameter corresponding to the fifth neighbor cell; and populating the sidefile with an eighth NSPE parameter corresponding to the fifth neighbor cell.

In some embodiments, relative to a first reference line, the fifth NSPE parameter represents a fifth distance from the first diagonal-corner of the subject cell to a fifth structure in the fifth neighbor cell that has a proximity effect upon the subject cell; relative to a second reference line, the sixth NSPE parameter represents a sixth distance from the second diagonal-corner of the subject cell to a sixth structure in the sixth neighbor cell that has a proximity effect upon the subject cell; relative to the second reference line, the seventh NSPE parameter represents a seventh distance from the third diagonal-corner of the subject cell to a seventh structure in the seventh neighbor cell that has a proximity effect upon the subject cell; and relative to the first reference line, the eighth NSPE parameter represents an eighth distance from the fourth diagonal-corner of the subject cell to an eighth structure in the eighth neighbor cell that has a proximity effect upon the subject cell.

In some embodiments, each of the fifth, sixth, seventh and eighth NSPE parameters includes a first part and a second part; the first part represents a distance in the first direction from the subject cell to the corresponding structure in the corresponding neighbor cell; and the second part representing a distance in the second direction from the subject cell to the corresponding structure in the corresponding neighbor cell.

In some embodiments, the first structure in the first neighbor cell is an N-type transistor; the second structure in the second neighbor cell is an N-type transistor; the generating a sidefile further includes: populating the sidefile with a third NSPE parameter corresponding to the first neighbor cell; and populating the sidefile with a fourth NSPE parameter corresponding to the second neighbor cell; relative to the first direction, the third NSPE parameter represents a third distance from the first side of the subject cell to a first P-type transistor in the first neighbor cell that has a proximity effect upon the subject cell; and relative to the first direction, the fourth NSPE parameter represents a fourth distance from the second side of the subject cell to a second P-type transistor in the second neighbor cell that has a proximity effect upon the subject cell.

In some embodiments, the aspect further comprising: performing a simulation of the semiconductor device, the simulation being based in part on the sidefile; and revising the layout diagram based on results of the simulation.

In some embodiments, the aspect further comprising: based on the layout diagram, at least one of: (A) making one or more photolithographic exposure; (B) fabricating one or more semiconductor masks; or (C) fabricating at least one component in a layer of a semiconductor integrated circuit.

In another aspect, a method of manufacturing a semiconductor device includes a corresponding layout diagram being stored on a non-transitory computer-readable medium, the layout diagram including a subset of transistor-to-well-edge-influenced (TWEI) cells, each TWEI cell including one or more transistors in one or more corresponding wells, the method comprising: generating a netlist which represents the subset, the generating a netlist including: for each TWEI cell represented in the netlist, and for a given transistor in a given well in a given cell, expanding the netlist to include one or more proximity-effect-inducer (PEI) parameters, each PEI parameter being related to an intra-cell physical proximity of the given transistor to an edge of the given well (given well-edge).

In some embodiments, for each TWEI cell represented in the netlist, and for the given transistor in given well in the given cell, the one or more PEI parameters include: a local PEI parameter; and a global PEI parameter; the local PEI parameter is represents a distance between the given transistor and the given well-edge; the local PEI parameter is based on the global PEI parameter; and the global PEI parameter is a variable common to the given cell and one or more additional cells represented in the netlist.

In some embodiments, the given transistor includes one or more fins; the distance between the given transistor and the given well-edge is a distance between a nearest fin and the given well-edge, the nearest fin being one amongst the one or more fins that is nearest to the given well-edge.

In some embodiments, the local PEI parameter is based at least in part on an integral of an expected value of a first order distribution for scattered well dopants.

In some embodiments, the local PEI parameter is also based at least in part on an integral of an expected value of a second order distribution for scattered well dopants.

In some embodiments, for each TWEI cell configured according to complementary metal-oxide-semiconductor (CMOS) technology (CMOS cell) that is represented in the netlist, and for an N-type metal-oxide-semiconductor (NMOS) transistor and a P-type metal-oxide-semiconductor (PMOS) transistor in a given CMOS cell, the one or more PEI parameters include: a first local PEI parameter; a second local PEI parameter; a first global PEI parameter; and a second global PEI parameter; the first local PEI parameter is based on a distance between the PMOS transistor and a corresponding well-edge of an N-type well; the second local PEI parameter is based on a distance between the NMOS transistor and a corresponding well-edge of a P-type well; the first global PEI parameter is a variable common to the given CMOS cell and one or more additional CMOS cells represented in the netlist; and the second global PEI parameter is a variable common to the given CMOS cell and the one or more additional CMOS cells represented in the netlist.

In some embodiments, each of the first and second local PEI parameters is based on an integral of an expected value of a first order distribution for scattered well dopants.

In some embodiments, for each TWEI cell configured according to complementary metal-oxide-semiconductor (CMOS) technology (CMOS cell) that is represented in the netlist, and for the N-type metal-oxide-semiconductor (NMOS) transistor and the P-type metal-oxide-semiconductor (PMOS) transistor in the given CMOS cell, the one or more PEI parameters further include: a third local PEI parameter; a fourth local PEI parameter; a third global PEI parameter; and a fourth global PEI parameter; the third local PEI parameter is based on a distance between the PMOS transistor and a corresponding well-edge of an N-type well; the fourth local PEI parameter is based on a distance between the NMOS transistor and a corresponding well-edge of a P-type well; the third global PEI parameter is a variable common to the given CMOS cell and the one or more additional CMOS cells represented in the netlist; and the fourth global PEI parameter is a variable common to the given CMOS cell and the one or more additional CMOS cells represented in the netlist.

In some embodiments, each of the third and fourth local PEI parameters is based on an integral of an expected value of a second order distribution for scattered well dopants.

In some embodiments, the aspect further comprising: performing a simulation of the semiconductor device, the simulation being based on the netlist; and revising the layout diagram based on results of the simulation.

In some embodiments, the aspect further comprising: based on the layout diagram, at least one of: (A) making one or more photolithographic exposure; (B) fabricating one or more semiconductor masks; or (C) fabricating at least one component in a layer of a semiconductor integrated circuit.

In some embodiments, for each TWEI cell represented in the netlist, and for the given transistor in given well in the given cell, the one or more PEI parameters include: a global PEI parameter, the global PEI parameter being a variable common to the given cell and one or more additional cells represented in the netlist.

In some embodiments, for each TWEI cell represented in the netlist, and for the given transistor in given well in the given cell, the one or more PEI parameters include: a local PEI parameter; the local PEI parameter represents a proximity relationship between the given transistor and the given well-edge; and the local PEI parameter is a function of the global PEI parameter.

In another aspect, a system for fabricating a semiconductor device, the system including: at least one processor; at least one non-transitory computer readable medium that stores computer executable code and a layout diagram corresponding to the semiconductor device; and the at least one non-transitory computer readable storage medium, the computer program code and the at least one processor being configured to cause the system to do as follows including: generating a netlist which represents subject cells in the layout diagram, the generating a netlist including: for each subject cell represented in the netlist, expanding the netlist to include one or more inter-cell proximity-effect-inducer (PEI) parameters, each inter-cell PEI parameter being related to a given type of structure in a given neighbor cell that induces an inter-cell proximity effect upon a given subject cell.

In some embodiments, for a subset of the subject cells in the netlist, the given type of structure in the given neighbor cell is a rectangular structure; and the at least one non-transitory computer readable storage medium, the computer program code and the at least one processor being configured to cause the system to do as follows including generating a netlist which represents subject cells in the layout diagram, for the subset of the subject cells in the netlist, the generating a netlist includes: configuring a corresponding one of the one or more inter-cell PEI parameters to be footprint parameter that represents a footprint of the rectangular structure in the given neighbor cell.

In some embodiments, for a subset of the subject cells in the netlist, the given type of structure in the given neighbor cell is an active region (AR); and the at least one non-transitory computer readable storage medium, the computer program code and the at least one processor being configured to cause the system to do as follows including generating a netlist which represents subject cells in the layout diagram, for the subset of the subject cells in the netlist, the generating a netlist includes: configuring a corresponding one of the one or more inter-cell PEI parameters to be AR-density parameter that represents a density of active regions in the given neighbor cell.

In another aspect, a system for fabricating a semiconductor device comprises: at least one processor; at least one non-transitory computer readable medium that stores computer executable code; the at least one non-transitory computer readable storage medium, the computer program code and the at least one processor being configured to cause the system to do as follows comprising: for a first subset of cells in the layout diagram, each subject one of the cells (subject cell) in the subset having a neighborhood including first and second neighbor cells on corresponding first and second sides of the subject cell relative to first direction, and for each cell in the first subset of the cells, generating a sidefile which includes: a first neighbor-specific proximity-effect (NSPE) parameter corresponding to the first neighbor cell; and populating the sidefile with a second NSPE parameter corresponding to the second neighbor cell; and for a second subset of transistor-to-well-edge-influenced (TWEI) cells in the layout diagram, each TWEI cell including one or more transistors in one or more corresponding wells, generating a netlist which represents the second subset, the generating a netlist including: for each TWEI cell represented in the netlist, and for a given transistor in a given well in a given cell, expanding the netlist to include one or more proximity-effect-inducer (PEI) parameters, each PEI parameter being related to an intra-cell physical proximity of the given transistor to an edge of the given well (given well-edge).

In some embodiments, the at least one non-transitory computer readable storage medium, the computer program code and the at least one processor being configured to cause: a simulation of the semiconductor device to be performed, the simulation being based on the sidefile and the netlist; and revision of the layout diagram based on results of the simulation.

In some embodiments, the aspect further comprising at least one of: a masking facility configured to fabricate one or more semiconductor masks based on the layout diagram; or a fabricating facility configured to fabricate at least one component in a layer of a semiconductor integrated circuit based on the layout diagram.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of manufacturing a semiconductor device, a corresponding layout diagram being stored on a non-transitory computer-readable medium, the layout diagram being arranged relative to first and second perpendicular directions, the layout diagram including cells such that, for a subset of the cells, each subject one of the cells (subject cell) in the subset has a neighborhood including first and second neighbor cells on corresponding first and second sides of the subject cell relative to the first direction, the method comprising:
for each subject cell in the subset,
generating a sidefile which represents neighborhood-specific proximity-effect information; and
wherein:
for each cell in the subset of the cells,
the generating a sidefile including:
populating the sidefile with a first neighbor-specific proximity-effect (NSPE) parameter corresponding to an inter-cell proximity-effect induced by the first neighbor cell, a first structure in the first neighbor cell being an N-type transistor; and
populating the sidefile with a second NSPE parameter corresponding to an inter-cell proximity-effect induced by the second neighbor cell, a second structure in the second neighbor cell is an N-type transistor;
relative to the first direction, the third NSPE parameter representing a third distance from the first side of the subject cell to a first P-type transistor in the first neighbor cell that has a proximity effect upon the subject cell; and
relative to the first direction, the fourth NSPE parameter representing a fourth distance from the second side of the subject cell to a second P-type transistor in the second neighbor cell that has a proximity effect upon the subject cell.

2. The method of claim 1, wherein:
relative to the first direction, the first NSPE parameter represents a first distance from the first side of the subject cell to a first structure in the first neighbor cell that has a proximity effect upon the subject cell; and relative to the first direction, the second NSPE parameter represents a second distance from the second side of the subject cell to a second structure in the second neighbor cell that has a proximity effect upon the subject cell.

3. The method of claim 1, wherein:
the neighborhood of each subject cell in the subset further includes:
third and fourth neighbor cells on corresponding third and fourth sides of the subject cell relative to the second direction; and
the generating a sidefile further includes:
populating the sidefile with a third NSPE parameter corresponding to the third neighbor cell; and
populating the sidefile with a fourth NSPE parameter corresponding to the third neighbor cell.

4. The method of claim 3, wherein:
the neighborhood of each subject cell in the subset further includes:
fifth sixth, seventh and eighth neighbor cells on corresponding first, second, third and fourth diagonal-corners of the subject cell relative to the first and second directions; and
the generating a sidefile further includes:
populating the sidefile with a fifth NSPE parameter corresponding to the fifth neighbor cell;
populating the sidefile with a sixth NSPE parameter corresponding to the fifth neighbor cell;
populating the sidefile with a seventh NSPE parameter corresponding to the fifth neighbor cell; and
populating the sidefile with an eighth NSPE parameter corresponding to the fifth neighbor cell.

5. The method of claim 1, further comprising:
performing a simulation of the semiconductor device, the simulation being based in part on the sidefile; and
revising the layout diagram based on results of the simulation.

6. The method of claim 5, further comprising:
based on the layout diagram, at least one of:
(A) making one or more photolithographic exposure;
(B) fabricating one or more semiconductor masks; or
(C) fabricating at least one component in a layer of a semiconductor integrated circuit.

7. The method of claim 2, wherein:
the first structure is a transistor; or
the second structure is a transistor.

8. The method of claim 3, wherein:
relative to the second direction, the third NSPE parameter represents a third distance from the third side of the subject cell to a third structure in the third neighbor cell that has a proximity effect upon the subject cell; and
relative to the second direction, the fourth NSPE parameter represents a fourth distance from the fourth side of the subject cell to a fourth structure in the fourth neighbor cell that has a proximity effect upon the subject cell.

9. A method of manufacturing a semiconductor device, a corresponding layout diagram being stored on a non-transitory computer-readable medium, the layout diagram being arranged relative to first and second perpendicular directions, the layout diagram including cells such that, for a subset of the cells, each subject one of the cells (subject cell) in the subset has a neighborhood including first and second neighbor cells on corresponding first and second sides of the subject cell relative to the first direction, the method comprising:

for each subject cell in the subset,
  generating a sidefile which represents neighborhood-specific proximity-effect information; and
wherein:
  for each cell in the subset of the cells,
    the generating a sidefile including:
      populating the sidefile with a first neighbor-specific proximity-effect (NSPE) parameter corresponding to an inter-cell proximity-effect induced by the first neighbor cell; and
      populating the sidefile with a second NSPE parameter corresponding to an inter-cell proximity-effect induced by the second neighbor cell;
  the neighborhood of each subject cell in the subset further includes:
    third and fourth neighbor cells on corresponding third and fourth sides of the subject cell relative to the second direction; and
  the generating a sidefile further includes:
    populating the sidefile with a third NSPE parameter corresponding to the third neighbor cell; and
    populating the sidefile with a fourth NSPE parameter corresponding to the third neighbor cell.

10. The method of claim 9, wherein:
relative to the first direction, the first NSPE parameter represents a first distance from the first side of the subject cell to a first structure in the first neighbor cell that has a proximity effect upon the subject cell; and
relative to the first direction, the second NSPE parameter represents a second distance from the second side of the subject cell to a second structure in the second neighbor cell that has a proximity effect upon the subject cell.

11. The method of claim 9, wherein:
the neighborhood of each subject cell in the subset further includes:
  fifth sixth, seventh and eighth neighbor cells on corresponding first, second, third and fourth diagonal-corners of the subject cell relative to the first and second directions; and
the generating a sidefile further includes:
  populating the sidefile with a fifth NSPE parameter corresponding to the fifth neighbor cell;
  populating the sidefile with a sixth NSPE parameter corresponding to the fifth neighbor cell;
  populating the sidefile with a seventh NSPE parameter corresponding to the fifth neighbor cell; and
  populating the sidefile with an eighth NSPE parameter corresponding to the fifth neighbor cell.

12. The method of claim 9, wherein:
a first structure in the first neighbor cell is an N-type transistor;
a second structure in the second neighbor cell is an N-type transistor;
the generating a sidefile further includes:
  populating the sidefile with a third NSPE parameter corresponding to the first neighbor cell; and
  populating the sidefile with a fourth NSPE parameter corresponding to the second neighbor cell;
relative to the first direction, the third NSPE parameter represents a third distance from the first side of the subject cell to a first P-type transistor in the first neighbor cell that has a proximity effect upon the subject cell; and
relative to the first direction, the fourth NSPE parameter represents a fourth distance from the second side of the subject cell to a second P-type transistor in the second neighbor cell that has a proximity effect upon the subject cell.

13. The method of claim 9, further comprising:
performing a simulation of the semiconductor device, the simulation being based in part on the sidefile; and
revising the layout diagram based on results of the simulation.

14. The method of claim 13, further comprising:
based on the layout diagram, at least one of:
(A) making one or more photolithographic exposure;
(B) fabricating one or more semiconductor masks; or
(C) fabricating at least one component in a layer of a semiconductor integrated circuit.

15. A method of manufacturing a semiconductor device, a corresponding layout diagram being stored on a non-transitory computer-readable medium, the layout diagram being arranged relative to first and second perpendicular directions, the layout diagram including cells such that, for a subset of the cells, each subject one of the cells (subject cell) in the subset has a neighborhood including first and second neighbor cells on corresponding first and second sides of the subject cell relative to the first direction, the method comprising:
for each subject cell in the subset,
  generating a sidefile which represents neighborhood-specific proximity-effect information; and
wherein:
  for each cell in the subset of the cells,
    the generating a sidefile including:
      populating the sidefile with a first neighbor-specific proximity-effect (NSPE) parameter corresponding to an inter-cell proximity-effect induced by the first neighbor cell, a first structure in the first neighbor cell being an N-type transistor;
      populating the sidefile with a second NSPE parameter corresponding to an inter-cell proximity-effect induced by the second neighbor cell, a second structure in the second neighbor cell is an N-type transistor;
      populating the sidefile with a third NSPE parameter corresponding to the first neighbor cell; and
      populating the sidefile with a fourth NSPE parameter corresponding to the second neighbor cell;
relative to the first direction, the third NSPE parameter representing a third distance from the first side of the subject cell to a first P-type transistor in the first neighbor cell that has a proximity effect upon the subject cell; and
relative to the first direction, the fourth NSPE parameter representing a fourth distance from the second side of the subject cell to a second P-type transistor in the second neighbor cell that has a proximity effect upon the subject cell; and
the method further comprising:
  performing a simulation of the semiconductor device, the simulation being based in part on the sidefile;
  revising the layout diagram based on results of the simulation; and
  based on the layout diagram, at least one of:
    (A) making one or more photolithographic exposure;
    (B) fabricating one or more semiconductor masks; or
    (C) fabricating at least one component in a layer of a semiconductor integrated circuit.

16. The method of claim 15, wherein:
relative to the first direction, the first NSPE parameter represents a first distance from the first side of the subject cell to a first structure in the first neighbor cell that has a proximity effect upon the subject cell; and
relative to the first direction, the second NSPE parameter represents a second distance from the second side of the subject cell to a second structure in the second neighbor cell that has a proximity effect upon the subject cell.

17. The method of claim 16, wherein:
the first structure is a transistor; or
the second structure is a transistor.

18. The method of claim 15, wherein:
the neighborhood of each subject cell in the subset further includes:
    third and fourth neighbor cells on corresponding third and fourth sides of the subject cell relative to the second direction; and
the generating a sidefile further includes:
    populating the sidefile with a third NSPE parameter corresponding to the third neighbor cell; and
    populating the sidefile with a fourth NSPE parameter corresponding to the third neighbor cell.

19. The method of claim 18, wherein:
the neighborhood of each subject cell in the subset further includes:
    fifth sixth, seventh and eighth neighbor cells on corresponding first, second, third and fourth diagonal-corners of the subject cell relative to the first and second directions; and
the generating a sidefile further includes:
    populating the sidefile with a fifth NSPE parameter corresponding to the fifth neighbor cell;
    populating the sidefile with a sixth NSPE parameter corresponding to the fifth neighbor cell;
    populating the sidefile with a seventh NSPE parameter corresponding to the fifth neighbor cell; and
    populating the sidefile with an eighth NSPE parameter corresponding to the fifth neighbor cell.

20. The method of claim 19, wherein:
relative to a first reference line, the fifth NSPE parameter represents a fifth distance from the first diagonal-corner of the subject cell to a fifth structure in the fifth neighbor cell that has a proximity effect upon the subject cell;
relative to a second reference line, the sixth NSPE parameter represents a sixth distance from the second diagonal-corner of the subject cell to a sixth structure in the sixth neighbor cell that has a proximity effect upon the subject cell;
relative to the second reference line, the seventh NSPE parameter represents a seventh distance from the third diagonal-corner of the subject cell to a seventh structure in the seventh neighbor cell that has a proximity effect upon the subject cell; and
relative to the first reference line, the eighth NSPE parameter represents an eighth distance from the fourth diagonal-corner of the subject cell to an eighth structure in the eighth neighbor cell that has a proximity effect upon the subject cell.

* * * * *